(12) United States Patent
Byun

(10) Patent No.: US 11,874,775 B2
(45) Date of Patent: Jan. 16, 2024

(54) METHOD AND APPARATUS FOR PERFORMING ACCESS OPERATION IN MEMORY SYSTEM UTILIZING MAP DATA INCLUDING MAPPING RELATIONSHIPS BETWEEN A HOST AND A MEMORY DEVICE FOR STORING DATA

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/842,416

(22) Filed: Apr. 7, 2020

(65) Prior Publication Data
US 2021/0026778 A1    Jan. 28, 2021

(30) Foreign Application Priority Data

Jul. 22, 2019  (KR) .......................... 10-2019-0088266

(51) Int. Cl.
*G06F 12/10*  (2016.01)
*G06F 12/06*  (2006.01)

(52) U.S. Cl.
CPC .......... *G06F 12/10* (2013.01); *G06F 12/0607* (2013.01)

(58) Field of Classification Search
CPC ....... G06F 12/10; G06F 12/06; G06F 12/0607
USPC ......... 711/157, 103, E12.008, E12.001, 206, 711/E12.002, 163, E12.058
See application file for complete search history.

(56) References Cited

U.S. PATENT DOCUMENTS

| | | |
|---|---|---|
| 5,740,465 A | 4/1998 | Matsunami et al. |
| 6,553,511 B1 | 4/2003 | DeKoning et al. |
| 6,996,676 B2 | 2/2006 | Megiddo et al. |
| 7,549,034 B2 | 6/2009 | Foster, Sr. et al. |
| 7,613,877 B2 | 11/2009 | Shimozono et al. |
| 7,856,530 B1 | 12/2010 | Mu |

(Continued)

FOREIGN PATENT DOCUMENTS

| | | |
|---|---|---|
| KR | 20110103447 A | 9/2011 |
| KR | 10-2017-0006427 A | 1/2017 |

(Continued)

OTHER PUBLICATIONS

Cai Y, et al., Error characterization, mitigation, and recovery in flash-memory-based solid-state drives, Sep. 2017, pp. 1666-1704, vol. 105, Proceedings of the IEEE.

(Continued)

*Primary Examiner* — Sanjiv Shah
*Assistant Examiner* — Edward Waddy, Jr.
(74) *Attorney, Agent, or Firm* — IP & T GROUP LLP

(57) ABSTRACT

A memory system includes a memory device including a plurality of memory dies that store data, and a controller coupled to the plurality of memory dies through a plurality of channels, and suitable for generating and managing map data in which a logical address of a host is corresponding to a physical address of the memory device, wherein, when logical information on two or more consecutive logical addresses requested to be accessed and physical information on two or more consecutive physical addresses corresponding to the two or more consecutive logical addresses are inputted from the host, the controller sequentially performs access operations on the physical addresses corresponding to the received physical information.

12 Claims, 17 Drawing Sheets

(56) References Cited

U.S. PATENT DOCUMENTS

| | | | |
|---|---|---|---|
| 8,972,957 B2 | 3/2015 | Bates et al. | |
| 9,003,126 B2 | 4/2015 | Cai et al. | |
| 9,104,599 B2* | 8/2015 | Atkisson | G06F 12/0875 |
| 9,329,846 B1 | 5/2016 | August et al. | |
| 9,378,135 B2 | 6/2016 | Bennett | |
| 9,400,749 B1 | 7/2016 | Kuzmin et al. | |
| 9,703,664 B1 | 7/2017 | Alshawabkeh et al. | |
| 10,268,584 B2 | 4/2019 | Hahn | |
| 10,783,071 B2 | 9/2020 | Wang et al. | |
| 2003/0041212 A1 | 2/2003 | Creta et al. | |
| 2005/0102297 A1 | 5/2005 | Lloyd et al. | |
| 2006/0212674 A1* | 9/2006 | Chung | G06F 12/0246 |
| | | | 711/202 |
| 2007/0118695 A1 | 5/2007 | Lowe et al. | |
| 2007/0220201 A1 | 9/2007 | Gill et al. | |
| 2009/0125548 A1 | 5/2009 | Moir et al. | |
| 2010/0088467 A1 | 4/2010 | Lee et al. | |
| 2011/0093648 A1 | 4/2011 | Belluomini et al. | |
| 2012/0072698 A1* | 3/2012 | Unesaki | G06F 12/0246 |
| | | | 711/E12.008 |
| 2012/0089811 A1* | 4/2012 | Sawai | G06F 12/1027 |
| | | | 711/E12.001 |
| 2012/0096225 A1 | 4/2012 | Khawand et al. | |
| 2012/0124294 A1 | 5/2012 | Atkisson et al. | |
| 2013/0124794 A1 | 5/2013 | Bux et al. | |
| 2013/0151777 A1 | 6/2013 | Daly et al. | |
| 2013/0151778 A1 | 6/2013 | Daly et al. | |
| 2013/0151780 A1 | 6/2013 | Daly et al. | |
| 2014/0047170 A1* | 2/2014 | Cohen | G06F 12/0246 |
| | | | 711/103 |
| 2014/0173234 A1* | 6/2014 | Jung | G06F 3/0688 |
| | | | 711/162 |
| 2014/0258638 A1 | 9/2014 | Traut et al. | |
| 2015/0301744 A1 | 10/2015 | Kim et al. | |
| 2015/0347028 A1 | 12/2015 | Kotte et al. | |
| 2015/0356020 A1 | 12/2015 | Desai et al. | |
| 2015/0378925 A1 | 12/2015 | Misra | |
| 2016/0147654 A1 | 5/2016 | Zhao et al. | |
| 2016/0267018 A1 | 9/2016 | Shimizu et al. | |
| 2016/0274797 A1 | 9/2016 | Hahn | |
| 2016/0299715 A1 | 10/2016 | Hashimoto et al. | |
| 2016/0371024 A1 | 12/2016 | Park et al. | |
| 2016/0378359 A1 | 12/2016 | Jang et al. | |
| 2017/0060202 A1 | 3/2017 | Sundaram et al. | |
| 2017/0109089 A1 | 4/2017 | Huang | |
| 2017/0192902 A1* | 7/2017 | Hwang | G06F 12/0246 |
| 2017/0351452 A1 | 12/2017 | Boyd et al. | |
| 2018/0067678 A1 | 3/2018 | Jeong et al. | |
| 2018/0088812 A1 | 3/2018 | Lee | |
| 2018/0101477 A1 | 4/2018 | Kan et al. | |
| 2018/0121121 A1 | 5/2018 | Mehra et al. | |
| 2019/0004591 A1 | 1/2019 | Park et al. | |
| 2019/0004944 A1 | 1/2019 | Widder et al. | |
| 2019/0042464 A1* | 2/2019 | Genshaft | G06F 12/0864 |
| 2019/0108131 A1* | 4/2019 | Lee | G06F 12/1433 |
| 2019/0171575 A1 | 6/2019 | Chen et al. | |
| 2019/0265976 A1* | 8/2019 | Goryavskiy | G06F 9/3016 |
| 2019/0266079 A1* | 8/2019 | R | G06F 3/0656 |
| 2019/0272104 A1 | 9/2019 | Durnov et al. | |
| 2019/0294546 A1 | 9/2019 | Agarwal et al. | |
| 2020/0151108 A1 | 5/2020 | Yen et al. | |
| 2020/0278797 A1 | 9/2020 | Bavishi | |
| 2020/0327063 A1 | 10/2020 | Kang et al. | |
| 2020/0334138 A1 | 10/2020 | Byun | |
| 2020/0334166 A1 | 10/2020 | Byun et al. | |

FOREIGN PATENT DOCUMENTS

| | | |
|---|---|---|
| KR | 10-2017-0081126 A | 7/2017 |
| KR | 20180026993 A | 3/2018 |
| KR | 20180135188 A | 12/2018 |

OTHER PUBLICATIONS

Office Action issued by the USPTO for U.S. Appl. No. 16/709,702 dated Oct. 14, 2021.

Notice of Allowance issued by the USPTO for U.S. Appl. No. 16/717,144 dated Jun. 10, 2021.

Office Action issued by the USPTO for U.S. Appl. No. 16/837,764 dated Aug. 18, 2021.

Office Action issued by the USPTO for U.S. Appl. No. 16/837,727 dated Oct. 7, 2021.

Notice of Allowance issued by the USPTO dated Mar. 4, 2022.

Office Action issued by the USPTO dated Apr. 26, 2022.

Differences between disk cache write-through and write-back, Huawei Enterprise Support Community, Jun. 6, 2016 <https://forum.huawei.com/enterprise/en/differences-between-disk-cache-write-through-and-write-back/thread/203781-891>.

Office Action issued by the USPTO for U.S. Appl. No. 16/709,702 dated Apr. 6, 2021.

Office Action on the Korean Patent Application No. 10-2019-0088353 issued by the Korean Patent Office dated Nov. 23, 2023.

* cited by examiner

FIG. 1C

MAP_C

| LA | PA |
|---|---|
| 1 | 5 |
| 2 | 6 |
| 3 | 7 |
| 4 | 8 |
| 5 | 9 |
| 6 | 10 |
| 7 | 11 |
| 8 | 12 |
| 9 | 13 |
| 10 | 14 |
| 11 | 101 |
| 12 | 98 |
| 13 | 56 |
| 14 | 23 |
| 15 | 24 |
| ⋮ | ⋮ |

(5 — Consecutive; 24 — Consecutive)

MAP_C_1

| LA | PA | nCPA |
|---|---|---|
| 1 | 5 | +9 |
| 2 | 6 | +8 |
| 3 | 7 | +7 |
| 4 | 8 | +6 |
| 5 | 9 | +5 |
| 6 | 10 | +4 |
| 7 | 11 | +3 |
| 8 | 12 | +2 |
| 9 | 13 | +1 |
| 10 | 14 | +0 |
| 11 | 101 | Null |
| 12 | 98 | Null |
| 13 | 56 | Null |
| 14 | 23 | +1 |
| 15 | 24 | +0 |
| ⋮ | ⋮ | ⋮ |

OR

MAP_C_2

| LA | PA |
|---|---|
| 1 | 5+9 |
| 2 | 6+8 |
| 3 | 7+7 |
| 4 | 8+6 |
| 5 | 9+5 |
| 6 | 10+4 |
| 7 | 11+3 |
| 8 | 12+2 |
| 9 | 13+1 |
| 10 | 14+0 |
| 11 | 101 |
| 12 | 98 |
| 13 | 56 |
| 14 | 23+1 |
| 15 | 24+0 |
| ⋮ | ⋮ |

FIG. 7B

PA_REF   RD_PR : 3 PIECES (Consecutive)

| LA | PA | nCPA |
|---|---|---|
| 1 | 5 | +9 |
| 2 | 6 | +8 |
| 3 | 7 | +7 |
| 4 | 8 | +6 |
| 5 | 9 | +5 |
| 6 | 10 | +4 |
| 7 | 11 | +3 |
| 8 | 12 | +2 |
| 9 | 13 | +1 |
| 10 | 14 | +0 |
| 11 | 101 | Null |
| 12 | 98 | Null |
| 13 | 56 | Null |
| 14 | 23 | +1 |
| 15 | 24 | +0 |
| ⋮ | ⋮ | ⋮ |

LA_REF → row 1
LA_1 → row 2
PA_1 : 10 PIECES (rows 1–10)

FIG. 8B

| LA | PA | nCPA |
|---|---|---|
| 1 | 5 | +9 |
| 2 | 6 | +8 |
| 3 | 7 | +7 |
| 4 | 8 | +6 |
| 5 | 9 | +5 |
| 6 | 10 | +4 |
| 7 | 11 | +3 |
| 8 | 12 | +2 |
| 9 | 13 | +1 |
| 10 | 14 | +0 |
| 11 | 101 | Null |
| 12 | 98 | Null |
| 13 | 56 | Null |
| 14 | 23 | +1 |
| 15 | 24 | +0 |
| ⋮ | ⋮ | ⋮ |

PA_REF — (row 7, PA=11)
RD_PR : Inconsecutive — (row 8, nCPA=+2)
LA_REF — (row 9, LA=9)
LA_1 — (row 10, LA=10)
PA_1 — {rows 9–10, PA=13, 14}

FIG. 9B

| | L2P_M_C | | |
|---|---|---|---|
| | LA | PA | nCPA |
| RD_PR : Consecutive | 1 | 5 | +9 |
| | 2 | 6 | +8 |
| | 3 | 7 | +7 |
| | 4 | 8 | +6 |
| | 5 | 9 | +5 |
| | 6 | 10 | +4 |
| PF_PR | 7 | 11 | +3 |
| | 8 | 12 | +2 |
| | 9 | 13 | +1 |
| | 10 | 14 | +0 |
| | 11 | 101 | Null |
| | 12 | 98 | Null |
| | 13 | 56 | Null |
| | 14 | 23 | +1 |
| | 15 | 24 | +0 |
| | ⋮ | ⋮ | ⋮ |

PA_1 brackets rows 1–10.

METHOD AND APPARATUS FOR PERFORMING ACCESS OPERATION IN MEMORY SYSTEM UTILIZING MAP DATA INCLUDING MAPPING RELATIONSHIPS BETWEEN A HOST AND A MEMORY DEVICE FOR STORING DATA

CROSS-REFERENCE TO RELATED APPLICATION

The present application claims priority under 35 U.S.C. § 119(a) to Korean Patent Application No. 10-2019-0088266, filed on Jul. 22, 2019, which is incorporated herein by reference in its entirety.

BACKGROUND

1. Field

Various embodiments relate to a memory system and a data processing device including the same, and more particularly, to a method and an apparatus for performing an access operation of the memory system.

2. Description of the Related Art

Recently, the paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a USB (Universal Serial Bus) memory device, a memory card having various interfaces, a solid state drive (SSD) or the like.

SUMMARY

Various embodiments of the present disclosure are directed to a memory system which transmits map data to a computing device or an external device including a host, a data processing system, in which the external device uses the map data to transmit address information, together with an access request, to the memory system, and an apparatus and a method, which may reduce the overhead of the memory system due to the operation of transmitting the map data to the external device.

Various embodiments of the present disclosure are directed to a memory system, a data processing system and a method for driving the memory system and the data processing system, which may reduce the overhead of the memory system due to unnecessary L2P conversion, and thus improve performance speed and efficiency of the command operation of the memory system as the memory device performs a command operation on a physical address inputted, together with a command, from an external device.

As a command operation is performed on a reference physical address inputted from an external device and one or more physical addresses consecutive to the reference physical address, there are provided a memory system, a data processing system and a method for driving the memory system and the data processing system according to various embodiments of the present disclosure, which may reduce command performing speed of the memory system, and thus improve performance speed and efficiency of the command operation of the memory system.

As a sequential access operation is performed when access to data, which are stored in physically consecutive spaces or accessible to consecutive physical addresses, is requested, there are provided a memory system, a data processing system and a method for driving the memory system and the data processing system according to various embodiments of the present disclosure, which may more efficiently access the data.

As read data according to a subsequently expected read request is prefetched when a sequential read operation is performed, there are provided a memory system, a data processing system and a method for driving the memory system and the data processing system according to various embodiments of the present disclosure, which may improve performance of the read operation of the memory system and prevent read disturbance.

Various embodiments of the present disclosure are directed to a memory system, a data processing system and a method for driving the memory system and the data processing system, which may improve performance of an access operation of the memory system by accessing data, requested to be accessed by a host, in an interleaving manner, and thus improve performance of the access operation.

According to an embodiment of the present invention, A memory system may comprise a memory device suitable for storing data; and a controller suitable for generating map data and for transmitting the map data to the host, wherein, when an access request may be received with logical information and physical information from the host, the controller may perform an access operation on a physical address range calculated based on the logical information and the physical information, and The physical information may include a reference physical address that may be corresponded to a reference logical address included in the logical information, and a consecutive physical address number that may be the number of consecutive physical addresses with the reference physical address.

The reference logical address may include a highest address index or a lowest address index, among logical addresses based on the logical information requested to be accessed by the host.

The logical information may further include a logical address range for indicating consecutive logical addresses with the reference logical address.

The logical address range may include the number of the consecutive logical addresses with the reference logical address.

When the reference logical address may include the lowest address index, the logical address range may include the highest address index, among the logical addresses based on the logical information, or when the reference logical address may include the highest address index, the logical address range may include the lowest address index, among the logical addresses based on the logical information.

The controller may generate the consecutive physical address number based on consecutive logical addresses and consecutive physical addresses included in the map data, and the controller may transmit the map data with the generated consecutive physical address number to the host.

The access request may include a read request.

The controller may determine whether a sequential read operation may be performable when the number of the consecutive logical addresses may be less or equal to the consecutive physical address number.

The controller may calculate the physical address range including a first consecutive physical addresses that the sequential read operation to be performed when the sequential read operation may be performable.

The controller may determine that a sequential prefetch operation may be performable when the number of the first consecutive physical addresses may be less than the consecutive physical address number.

The controller may calculate a prefetch physical range including a second consecutive physical addresses, except for the first consecutive physical addresses, among consecutive physical addresses based on the physical information when the sequential prefetch operation may be performable.

The controller may perform the prefetch operation while the sequential read operation may be performed in an interleaving manner.

The controller may transmit prefetched data, which may be a result of the sequential prefetch operation, to the host when a subsequent read request for requesting the prefetched data may be received.

When the reference physical address may be invalid, the controller searches for valid physical addresses corresponding to the logical information in the map data stored in the controller, and The controller may perform the access operation on the searched physical addresses.

The controller may perform the access operations in an interleaving manner.

According to an embodiment of the present invention, a method for performing access operation of a memory system, the method comprising: receiving an access request may be received with logical information and physical information from a host; and performing an access operation on a physical address range calculated based on the logical information and the physical information, the physical information may include a reference physical address that may be corresponded to a reference logical address included in the logical information, and a consecutive physical address number that may be the number of consecutive physical addresses with the reference physical address.

The reference logical address may include a highest address index or a lowest address index, among logical addresses based on the logical information requested to be accessed by the host.

The logical information may further include a logical address range for indicating consecutive logical addresses with the reference logical address.

The logical address range may include the number of the consecutive logical addresses with the reference logical address.

When the reference logical address may include the lowest address index, the logical address range may include the highest address index, among the logical addresses based on the logical information, or wherein when the reference logical address may include the highest address index, the logical address range may include the lowest address index, among the logical addresses based on the logical information.

The method may further comprise generating the consecutive physical address number based on consecutive logical addresses and consecutive physical addresses included in the map data.

The method may further comprise transmitting the map data with the generated consecutive physical address number to the host.

The access request may include a read request.

The logical information may include the reference logical address and a logical address range of the consecutive logical addresses which may be consecutive with the reference logical address.

The logical address range may include the number of consecutive logical addresses which may be consecutive with the reference logical address.

The logical address range may include the highest address index when the reference logical address may include the lowest address index.

The logical address range may include the lowest address index when the reference logical address may include the highest address index.

The method may further comprise generating the consecutive physical address number based on the plurality of physical addresses, and the map data may be transmitted together with the generated consecutive physical address number to the host.

The logical information and the physical information may be included in one access request received from the host.

The access request may include a read request.

The method may further comprise determining whether the plurality of physical addresses may be consecutive based on the logical information and the physical information; and determining whether or not a sequential read operation related to the read request can be performed based on the determination of whether the plurality of physical addresses may be consecutive.

The method may further comprise determining whether the plurality of physical addresses may be consecutive based on the logical information and the physical information; and determining whether or not a sequential prefetch operation not related to the read request can be performed based on the determination of whether the plurality of physical addresses may be consecutive.

The method may further comprise performing the sequential read operation based on the determination of whether or not the sequential read operation related to the read request can be performed; and performing the sequential prefetch operation based on the determination of whether or not the sequential prefetch operation not related to the read request can be performed.

The prefetch operation may be performed while the sequential read operation may be performed in an interleaving manner when channels respectively for the sequential read operation and the prefetch operation may be different from each other.

The method may further comprise transmitting prefetched data, which may be a result of the sequential prefetch operation, to the host when a subsequent read request may be received after the read request from the host.

The method may further comprise searching for valid physical addresses corresponding to the logical information in the map data stored in the memory system when the plurality of consecutive physical addresses may be invalid.

The access operation may be performed on the searched physical addresses.

According to an embodiment of the present invention, An operating method of a controller, the operating method comprising: receiving, from a host, an access request together with consecutive logical addresses and consecutive physical addresses, start addresses of the respective consecutive addresses being mapped to each other; and accessing, when a size of the consecutive logical addresses may be equal to or less than a size of the consecutive physical addresses, a storage region indicated by access-requested physical addresses respectively mapped to the consecutive logical addresses.

These and other features and advantages of the present disclosure are not limited to the embodiments described above, and will become apparent to those skilled in the art of the present disclosure from the following detailed description in conjunction with the accompanying drawings.

BRIEF DESCRIPTION OF THE DRAWINGS

FIGS. 1A to 1E illustrate an example of a method for performing an access operation by a data processing system in accordance with an embodiment.

FIGS. 7A and 7B illustrate an example of a method for performing the read operation by a data processing system, including the memory system illustrated in FIG. 6, in accordance with an embodiment.

FIGS. 8A and 8B illustrate another example of a method for performing the read operation by the data processing system, including the memory system illustrated in FIG. 6, in accordance with an embodiment.

FIGS. 9A and 9B illustrate an example of a method for performing a data prefetch operation by the memory system illustrated in FIG. 6.

DETAILED DESCRIPTION

Hereinafter, various embodiments of the present disclosure are described below in detail with reference to the accompanying drawings. The following description focuses on features and aspects of the present invention; well-known technical details are omitted so as not to obscure the subject matter of the present disclosure. Throughout the specification, reference to "an embodiment," "another embodiment" or the like is not necessarily to only one embodiment, and different references to any such phrase are not necessarily to the same embodiment(s).

Figure 1A:
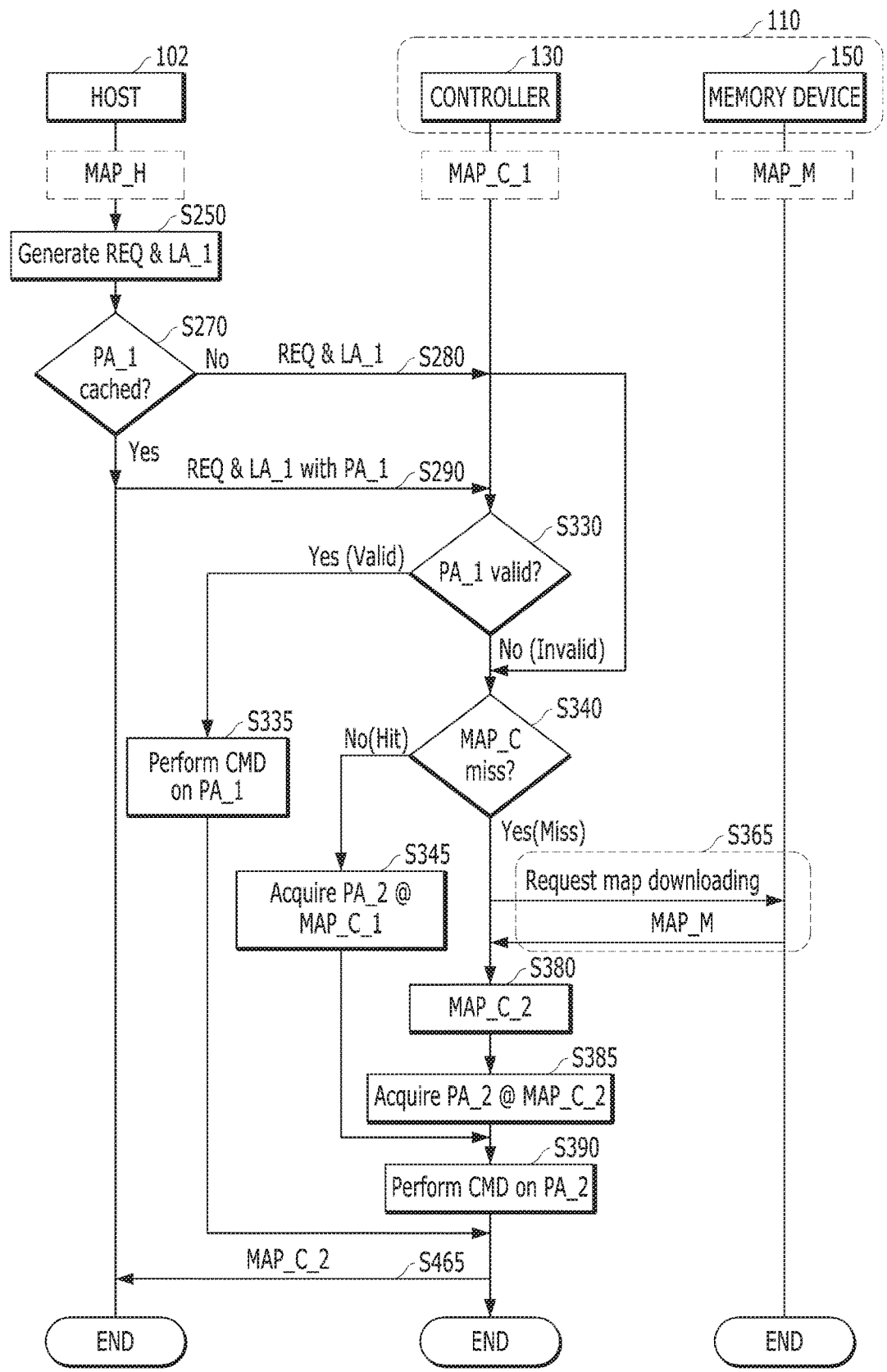

FIG. 1A illustrates a method for performing a map downloading operation, corresponding to logical and physical addresses, transmitted from a host 102 to a memory system 110, and a map cache of the memory system 110, in a data processing system.

FIG. 1A illustrates a data processing system in which the host 102 can transmit a logical address and a physical address corresponding to the logical address to the memory system 110, in order to improve the input/output performance of the memory system 110.

Referring to FIG. 1A, the data processing system in accordance with an embodiment includes the host 102 and the memory system 110. The host 102 may include a processor, a host controller interface and a host memory. The memory system 110 may include a controller 130 and a memory device 150. When power is supplied to the host 102 and the memory system 110 (power-on), the host 102 and the memory system 110 may be operably connected with each other. At this time, the memory system 110 may download memory map data MAP_M stored in the memory device 150. The memory system 110 may store the memory map data MAP_M downloaded from the memory device 150 as controller map data MAP_C_1 into a cache memory of the controller 130. The memory system 110 may upload the controller map data MAP_C_1 to the host 102. The host 102 may store the controller map data MAP_C received from the memory system 110 as host map data MAP_H into a host memory. In this way, the host map data MAP_H are stored in the host memory, the memory map data MAP_M are stored in the memory device 150, and the controller map data MAP_C_1 are stored in the memory of the memory system 110.

The processor within the host 102 generates a request REQ and a first logical address LA_1 corresponding to the target of the request REQ in step S250. The host controller interface receives the generated request REQ and the first logical address LA_1 from the processor. The host controller interface may determine whether a first physical address PA_1 corresponding to the first logical address LA_1 is stored (PA_1 cached), based on logical-to-physical (L2P) map data included in the host map data MAP_H stored in the host memory, in step S270.

The storage capacity of a host memory may be larger than the storage capacity of the cache memory of in the memory system 110. Therefore, even though all or most of memory map data MAP_M, not a part thereof, stored in the memory device 150 are transmitted to the host memory, operations of the host 102 and the memory system 110 may not be burdened. The size of a space allocated to store host map data MAP_H in the host memory may be equal to or smaller than the size of controller map data MAP_C. In addition, the size of a space allocated to store the host map data MAP_H in the host memory may be larger than the size of the controller map data MAP_C. When the size of the space allocated to the host map data MAP_H is limited to a predetermined size, the host 102 may select a release policy of the host map data MAP_H. For example, when there is not enough space in a storage space allocated to the host map data MAP_H to store a new map segment MS, the host 102 may discard a part of the host map data MAP_H and store new map data, according to a Least Recently Used (LRU) policy or a Least Frequently Used (LFU) policy. In addition, when map data MD is updated through a garbage collection operation or a wear leveling operation in the memory system 110, the controller 130 may upload an updated portion to the host 102 as the controller map data MAP_C. The host 102 may invalidate an old portion of the host map data MAP_H, which corresponds to the updated portion.

When a first physical address PA_1 corresponding to a first logical address LA_1 is not stored in the host map data MAP_H, a host controller interface transmits the request REQ and the first logical address LA_1 to the memory system 110 without the first physical address PA_1. In this case, the host controller interface may include the first logical address LA_1 with the request REQ and transmit the same to the memory system 110.

When the determination result of step S270 indicates that the first physical address PA_1 corresponding to the first logical address LA_1 is not included in the host map data MAP_H (No in step S270), the host controller interface transfers the request REQ and the first logical address LA_1 to the memory system 110 without the first physical address PA_1, in step S280. At this time, the host controller interface may transmit the first logical address LA_A with the request REQ to the memory system 110.

When the determination result of step S270 indicates that the first physical address PA_1 corresponding to the first logical address LA_1 is included in the host map data MAP_H (Yes in step S270), the host controller interface transfers the first physical address PA_1 with the request REQ and the first logical address LA_1 to the memory system 110 in step S290. At this time, the host controller interface may include the first physical address PA_1 in a reserved area of a command format of the request REQ, and transmit the first physical address PA_1 with the request REQ to the memory system 110.

When only the request REQ and the first logical address LA_1 without the first physical address PA_1 are received from the host 102 in step S280, the memory system 110 determines whether a map miss occurs between the first logical address LA_1 and the controller map data MAP_C_1, in step S340. That is, the memory system 110 determines whether L2P map data for the first logical address LA_1 are included in the controller map data MAP_C_1, in step S340.

When the first physical address PA_1 is received with the request REQ and the first logical address LA_1 from the host 102 in step S290, the memory system 110 determines the validity of the first physical address PA_1 received with the request REQ in step S330. At this time, the memory system 110 may determine whether the first physical address PA_1 is valid, using dirty information or invalid address information.

When the determination result of step S330 indicates that the first physical address PA_1 is valid (Yes in step S330), the memory system 110 may perform a command operation on the first physical address PA_1 in step S335.

When the determination result of step S330 indicates that the first physical address PA_1 is not valid (No in step S330), the memory system 110 determines that the first physical address PA_1 is invalid. Furthermore, the memory system 110 searches for a valid physical address in order to perform the command operation for the first logical address LA_1 on the valid physical address. For this operation, the memory system 110 determines whether a map miss occurs between the first logical address LA_1 and the controller map data MAP_C_1, in step S340. That is, the memory system 110 determines whether the map data for the first logical address LA_1 are included in the controller map data MAP_C_1 stored in the memory of the controller 130, in step S340.

When the determination result of step S340 indicates that the map data for the first logical address LA_1 are included in the controller map data MAP_C_1 (No in step S340), the memory system 110 determines that a map hit, not a map miss, occurred between the first logical address LA_1 and the controller map data MAP_C_1. Thus, the memory system 110 acquires a second physical address PA_2 by searching the controller map data MAP_C_1, the second physical address PA_2 being a valid physical address corresponding to the first logical address LA_1, in step S345. The memory system 110 performs the command operation on the second physical address PA_2 acquired in step S345, in step S390.

When the determination result of step S340 indicates that the map data for the first logical address LA_1 are not included in the controller map data MAP_C_1 (Yes in step S340), the memory system 110 determines that a map miss occurred between the first logical address LA_1 and the controller map data MAP_C_1. That is, the memory system 110 determines that the second physical address PA_2 corresponding to the first logical address LA_1 are not included in the controller map data MAP_C_1.

Therefore, the memory system 110 performs a map download operation for the memory map data MAP_M in step S365. The memory system 110 may request the memory map data MAP_M including the map data of the first logical address LA_1 from the memory device 150. The memory device 150 may transmit the memory map data MAP_M, which includes the valid physical address corresponding to the first logical address LA_1, to the memory system 110 according to a map download request received from the memory system 110. The memory system 110 may store the memory map data MAP_M received from the memory device 150 in the memory. Thus, the controller map data MAP_C_1 may be updated into controller map data MAP_C_2 in step S380.

The memory system 110 acquires the second physical address PA_2 corresponding to the first logical address LA_1 by searching the controller map data MAP_C_2, updated in step S380, in step S385. The memory system 110 may perform a command operation on the second physical address PA_2 acquired in step S385, in step S390.

Then, the memory system 110 may transmit a response to the host 102, the response including a message indicating that the operation for the request REQ received from the host 102 has been completed.

In the present embodiment, when the memory system 110 receives the first logical address LA_1 and the first physical address PA_1 corresponding to the first logical address LA_1 together from the host 102 in step S290 and the first physical address PA_1 is valid (Yes in step S330), steps S345 and S385 of searching for the second physical address PA_2 may be omitted. In particular, when the first physical address PA_1 is valid (Yes in step S330) and the map data for the first logical address LA_1 are included in the controller map data MAP_C_1 (map hit, No in step S340), the map downloading S365 in which the memory system 110 searches for the second physical address PA_2 may be omitted. This configuration can further shorten the performance time of the command operation performed by the memory system 110.

Hereinafter, a method for performing the access operation by the data processing system in accordance with an embodiment is described with reference to FIGS. 1B to 1E.

Figure 1B:
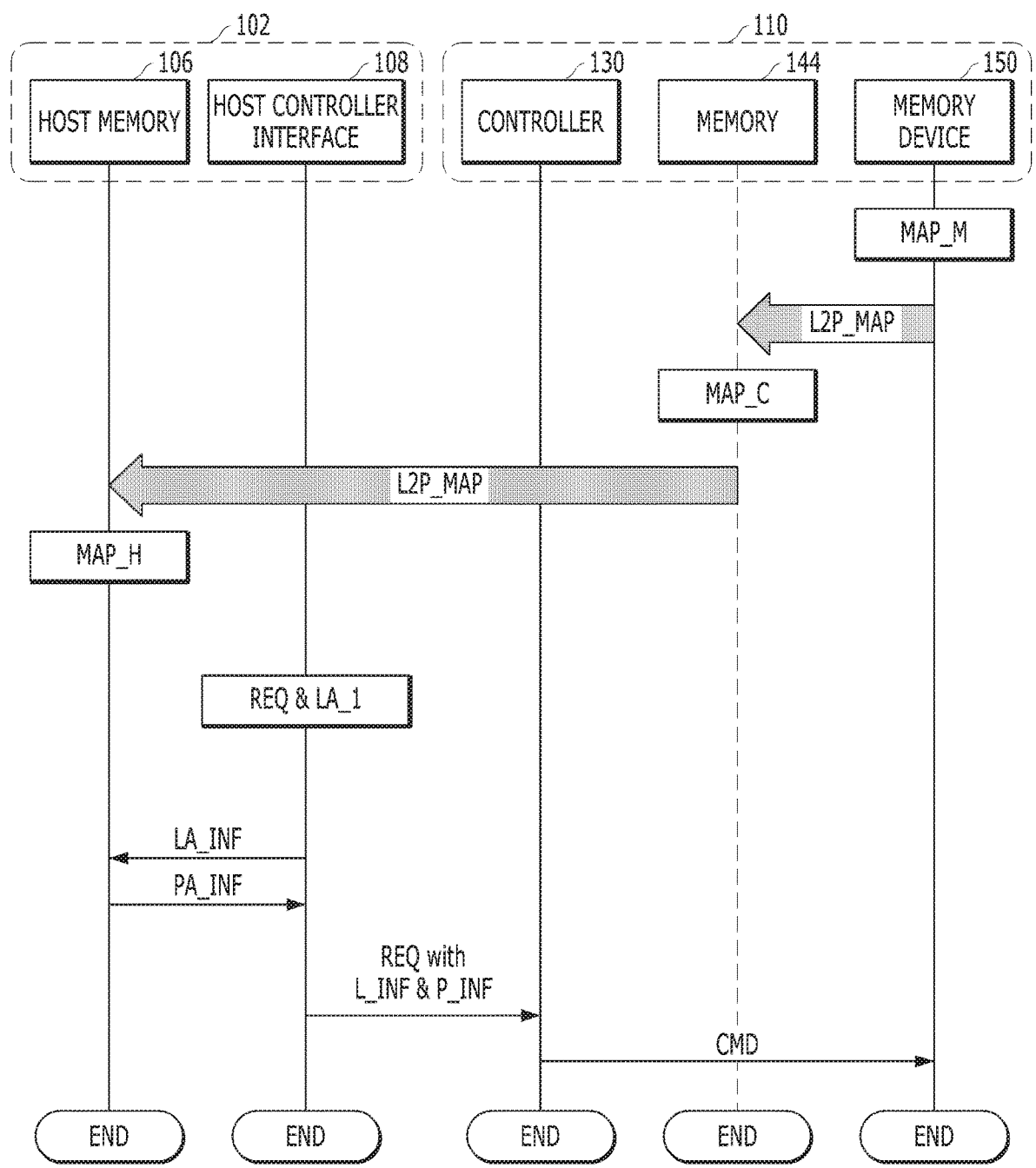
Figure 1D:
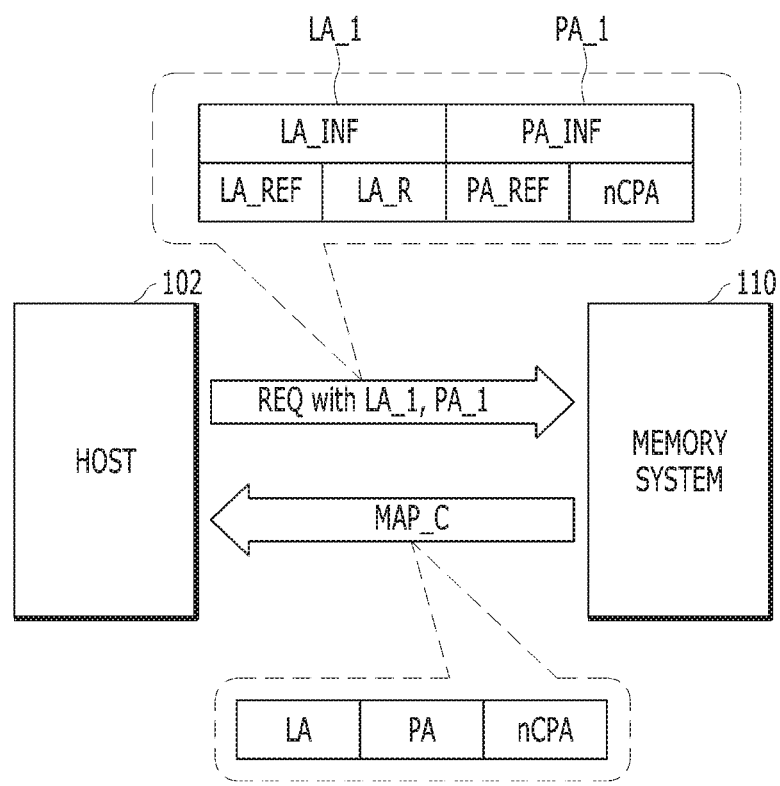
Figure 1E:
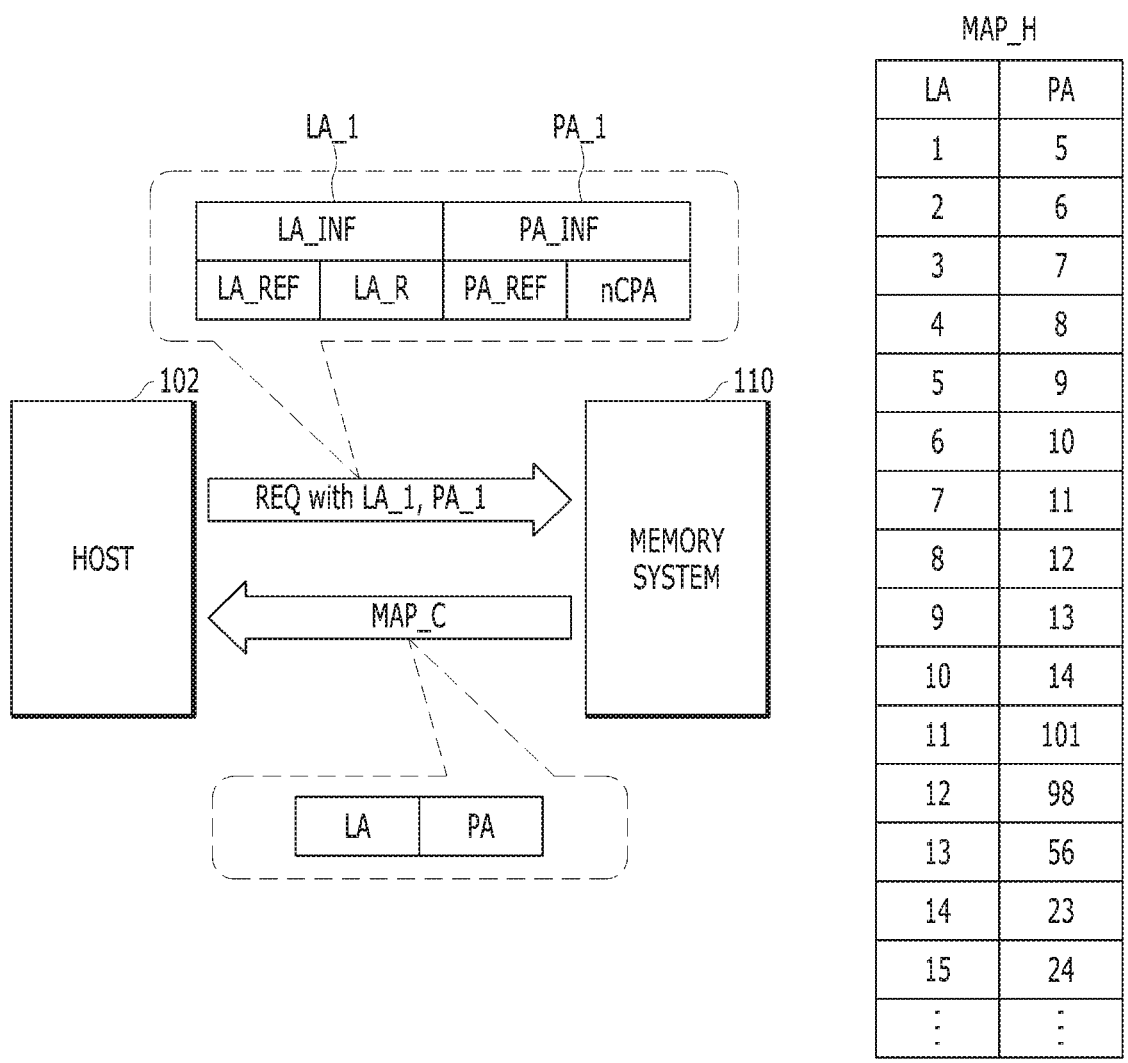

FIG. 1B illustrates an example of the controller map data MAP_C generated by the memory system 110. FIG. 1C illustrates an example of an access request and map data between a host and a memory system. FIG. 1D illustrates another example of an access request and map data between a host and a memory system. FIG. 1E illustrates another example of an access request and map data between a host and a memory system.

Referring to FIG. 1C, the controller map data MAP_C includes L2P (Logical to Physical) map information comprising a logical address LA of the host 102 and a physical address PA of the memory device 150.

Particularly, in the present embodiment, the controller map data MAP_C further includes a consecutive physical address number nCPA, as shown in MAP_C_1. In the present embodiment, the consecutive physical address number nCPA is included in a physical address PA, as shown in MAP_C_2.

The consecutive physical address number nCPA is the number of two or more consecutive physical addresses that are consecutive with a certain physical address PA. When a plurality of physical addresses PA corresponding to a plurality of consecutive logical addresses LA are consecutive, the controller 130 may generate the consecutive physical address number nCPA of each consecutive physical addresses, respectively. That is, when the physical addresses 'PA5 to PA14' corresponding to the consecutive logical addresses LA1 to LA10 are all consecutive, the controller 130 may generate the consecutive physical address number nCPA for each of the consecutive physical addresses PA5 to PA14, respectively.

Referring to FIG. 1C, the consecutive physical address number nCPA of the physical address PA5 is '+9'. It means that the number of consecutive physical addresses which are consecutive with the physical address PA5 is '9'. That is, there are nine consecutive physical addresses which are consecutive with the physical address PA5, as shown in the MAP_C_1. As shown in the MAP_C_2, the consecutive physical address number nCPA of '+9' may be included in the physical address PA5 corresponding to the logical addresses LA1 thereby having a form of '5+9'.

Referring to FIG. 1D, the memory system 110 transmits the controller map data MAP_C including a plurality of L2P map information, to the host 102. Each of the L2P map information includes a logical address LA, a physical address PA and the consecutive physical address number nCPA. The consecutive physical address number nCPA is the number of physical addresses that are consecutive with the physical address PA.

The host 102 may store the controller map data MAP_C as the host map data MAP_H in the host memory 106. The host 102 may transmit an access request REQ with the L2P map information to the memory system 110.

When the number of the logical address LA in the L2P map information is in a plural, a plurality of physical addresses corresponding to the plurality of logical addresses are also required.

In this embodiment of the present invention, consecutive logical addresses related to the access request REQ and received from the host 102 is referred to as a first logical address LA_1. In this embodiment of the present invention, the consecutive physical addresses related to the access request REQ and received from the host 102 is referred to as a first physical address PA_1.

As shown in FIG. 1D, a logical information LA_INF includes a reference logical address LA_REF and a logical address range LA_R. The logical information LA_INF is for indicating the plurality of logical addresses included in the first logical address LA_1. The plurality of logical addresses in the first logical address LA_1 may be indicated by one reference logical address LA_REF and a logical address range LA_R which are consecutive with the reference logical address LA_REF.

A physical information PA_INF includes a reference physical address PA_REF and a consecutive physical address number nCPA. The reference physical address PA_REF is a physical address corresponding to the reference logical address LA_REF. The consecutive physical address number nCPA is the number of a plurality of the physical addresses that are consecutive with the reference physical address PA_REF.

The reference logical address LA_REF may have the lowest address index or the highest address index, among consecutive logical addresses related to the access request REQ. For example, when the logical addresses related to the access request REQ are 'LA1 to LA10', the reference logical address LA_REF may be 'LA1' having the lowest address index or 'LA10' having the highest address index.

According to the embodiment, the logical address range LA_R may indicate a size or a length of the two or more consecutive logical addresses related to the access request REQ.

The logical address range LA_R may include a range of the consecutive logical addresses having address indexes sequentially increased by 1. The logical address range LAR may include a range of the consecutive logical addresses having address indexes sequentially decreased by 1. The address indexes are consecutive with the address index from the reference logical address LA_REF. For example, if the first logical address LA_1 includes logical addresses to LA10' and the reference logical address LA_REF is 'LA1', the number of logical addresses consecutive with to the reference logical address LA_REF may be '+9'. That is, there are nine consecutive logical addresses which are consecutive with the reference logical address LA_REF of 'LA1'.

According to the embodiment, if the reference logical address LA_REF has the lowest address index, the logical address range LA_R may have the highest address index. For example, if the first logical address LA_1 includes logical addresses 'LA1 to LA10', and the reference logical address LA_REF is 'LA1', the logical address range LA_R may be indicated by 'LA10'. When the reference logical address LA_REF is the logical address having the highest address index, the logical address range LA_R may be indicated by the logical address having the lowest address index. For example, when the logical addresses related to the access request REQ are 'LA1 to LA10', and the reference logical address LA_REF is 'LA10', the logical address range LA_R may be indicated by 'LA1'.

Consequently, in the present embodiment, when the plurality of the logical addresses are 'LA1 to LA10', the host 102 may generate one format of 'LA1+9' or 'LA1,LA10' as an example of the combination of the reference logical address LA_REF and the logical address range LA_R, with reference to the host map data MAP_H.

The reference physical address PA_REF may be a physical address corresponding to the reference logical address LA_REF. The consecutive physical address number nCPA may include the number of consecutive physical addresses, which are one or more physical addresses consecutive with the reference physical address PA_REF.

In this case, the host controller interface 108 may include the logical information LA_INF and the physical information PA_INF in a reserved region of an command format of the access request REQ, and transmit the logical address range LA_R and the physical information PA_INF, included in the reserved region of the command format, to the memory system 110.

When receiving, from the host 102, the access request REQ with the logical information LA_INF and the physical information PA_INF, the memory system 110 determines validity of the reference physical address PA_REF included in the physical information PA_INF.

When the reference physical address PA_REF is valid, the memory system 110 may perform the command operation on a physical location of the memory device 150, which corresponds to a physical address range calculated based on the logical information LA_INF and the physical information PA_INF.

In the present embodiment, when the host 102 transmits an access request for a plurality of logical addresses to the memory system 110, the host 102 does not transmit the plurality of logical addresses to the memory system 110 a plurality of times. The host 102 according to the present embodiment may request access to the plurality of logical addresses by transmitting the reference logical address LA_REF and the logical address range LA_R to the memory system 110 one time. In other words, the logical information LA_INF and the physical information PA_INF may be included in one access request ACESS_REQ inputted from the host 102.

In the present embodiment, as the memory system 110 does not separately perform an L2P conversion operation and a map loading operation. The memory system 110 may directly performs the command operation on the physical address range calculated based the logical information LA_INF and the physical information PA_INF. Accordingly, a performance time of the command operation performed in the memory system 110 may be shortened.

In the present embodiment, as illustrated in FIG. 1E, the memory system 110 may uploads the L2P map information which does not include the consecutive physical address number nCPA. In this case, the host 102 may store the L2P map information without the consecutive physical address number nCPA, as the host map data MAP_H.

When the host 102 requests an access to the memory system 110, the host 102 may generate the physical information PA_INF including the reference physical address PA_REF and the consecutive physical address number nCPA using the L2P map information stored in the host map data MAP_H. The host 102 may transmit the physical information PA_INF to the memory system together with the access request REQ.

Figure 2:
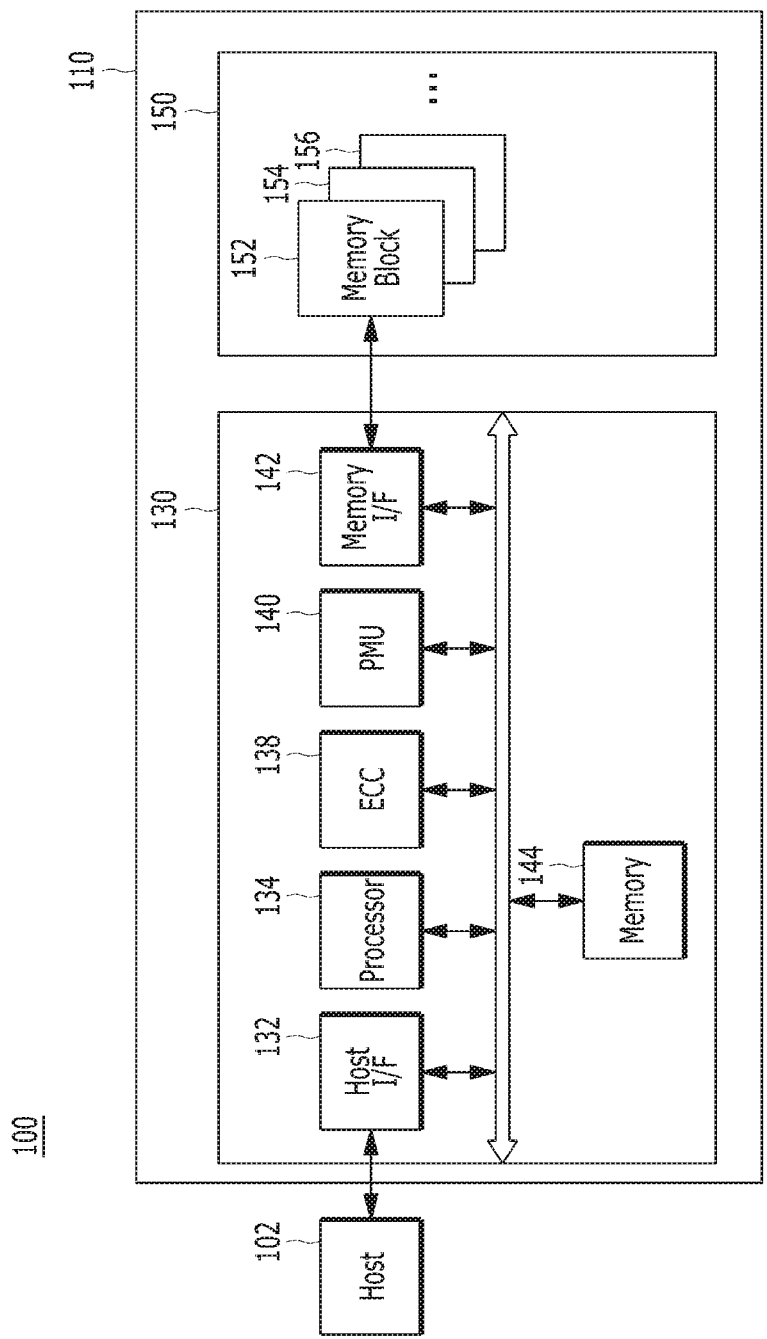
FIG. 2 illustrates an example of a data processing system including a memory system in accordance with an embodiment.

FIG. 2 is a block diagram illustrating a data processing system 100 according to an embodiment of the present invention.

Referring to FIG. 2, a data processing system 100 may include a host 102 engaged or operably coupled to a memory system 110.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By way of example but not limitation, the OS can be a general operating system or a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems, corresponding to a user's request. The host 102 may transmit a plurality of commands corresponding to the user's requests to the memory system 110, thereby performing operations corresponding to commands within the memory system 110. Handling plural commands in the memory system 110 is described below with reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM) a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated into an SSD to improve an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC micro), a SD card (SD, mini SD, microSD, SDHC), a universal flash memory or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device that retains stored data even when electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks. In addition, the memory device 150 may be a non-volatile memory device, for example a flash memory, wherein the flash memory may be a three-dimensional stack structure.

The controller 130 may control overall operations of the memory device 150, such as read, write, program, and erase operations. For example, the controller 130 may control the memory device 150 in response to a request from the host 102. The controller 130 may provide the data, read from the memory device 150, to the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (DATA), small computer system interface (SCSI), enhanced small disk interface (ESDI) and/or integrated drive electronics (IDE). According to an embodiment, the host interface 132 exchanges data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data to which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation, such as a low density parity check (LDDC) code, a Bose-Chaudhuri-Hocquenghem (BCH) code, a turbo code, a Reed-Solomon (RS) code, a convolution code, a recursive systematic code (RSC), a trellis-coded modulation (TCM), and/or a Block coded modulation (BCM). The ECC component 138 may include any and all circuits, modules, systems or devices for performing the error correction operation based on at least one of the above described codes.

The PMU 140 may manage, control or provide an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of a NAND flash interface, in particular, operations between the controller 130 and the memory device 150. According to an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 2 exemplifies the second memory 144 disposed within the controller 130, the present invention is not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data for performing operations such as data writing and data reading requested by the host 102 and/or data transfer between the memory device 150 and the controller 130 for background operations such as garbage collection and wear levelling as described above. According to an embodiment, for supporting operations in the memory system 110, the memory 144 may include a program memory, a data memory, a write buffer/cache, a read buffer/cache, a data buffer/cache, a map buffer/cache, and the like.

The memory 144 may store map data and state information. The controller map data includes L2P map data comprising L2P segments including a logical address used in the host 102 and a physical address of the memory device 150 corresponding to the logical address. The controller map data may further include P2L map data comprising P2L segments including the physical address used and the logical address corresponding to the physical address.

According to an embodiment, when an erase request E_REQ with the first logical address from the host 102 is received, the controller 130 correlates the first logical address from the host 102 to erase information E_INF including an erased physical address EPA or an erased state value EV. At this time, the controller 130 may perform an unmap operation to the first logical address by invalidating a physical address corresponding to the first logical address in the map data. Then the controller 130 corresponds the first logical address into an erased physical address EPA or an erased state value EV in the map data.

In addition, the memory 144 may store state information as well as controller map data. The state information may include dirty information, invalid address information, valid storage element information, free block number information, and erased state information. The memory system 110 may determine validity of a physical address and a logical address received with an erase request E_REQ from a host 102 using dirty information or invalid address information. In an embodiment of the present disclosure, when the erase request E_REQ is received with the logical address, the controller 130 updates an erase state information of the logical address to have an erase state value EV. In addition, the memory system 110 may invalidate a physical address corresponding to a logical address of the erase request E_REQ, and then change the valid page count VPC of the memory block corresponding to the invalidated physical address. In addition, the memory system may perform garbage collection on a memory block having a number of valid pages less than a set number. When the free block number information is less than or equal to a set number, the memory system 110 may perform garbage collection.

The processor 134 may be implemented with a microprocessor and/or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. According to an embodiment, the processor 134 may use or execute firmware to control the overall operations of the memory system 110. Herein, the firmware may be referred to as a flash translation layer (FTL). The FTL may perform an operation such as, an interface between the host 102 and the memory device 150. The host 102 may transmit requests for write and read operations to the memory device 150 through the FTL.

The FTL may manage operations of address mapping, garbage collection, wear-leveling and the like. Particularly, the FTL may load, generate, update, or store map data. Therefore, the controller 130 may map a logical address, which is entered from the host 102, with a physical address of the memory device 150 through the map data. The memory device 150 may act like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to a command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes copying data stored in a memory block among the memory blocks 152, 154, 156 in the memory device 150 to another memory block, e.g., a garbage collection (GC) operation. The background operation can include moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g, a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) corresponding to a plurality of memory dies included in the memory device 150. The controller 130 may determine the state of each channel or each way as a busy state, a ready state, an active state, an idle state, a normal state and/or an abnormal state. The controller's determination of which channel or way an instruction (and/or a data) is delivered through can be corresponding to a physical block address, e.g., which die(s) the instruction (and/or the data) is delivered to. The controller 130 can refer to descriptors delivered from the memory device 150. The descriptors can include a block or page of parameters that describe something about the memory device 150, which is data with a specific format or structure. For instance, the descriptors may include device descriptors, configuration descriptors, unit descriptors, and the like. The controller 130 can refer to, or use, the descriptors to determine with which channel(s) or way(s) an instruction or a data is exchanged.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
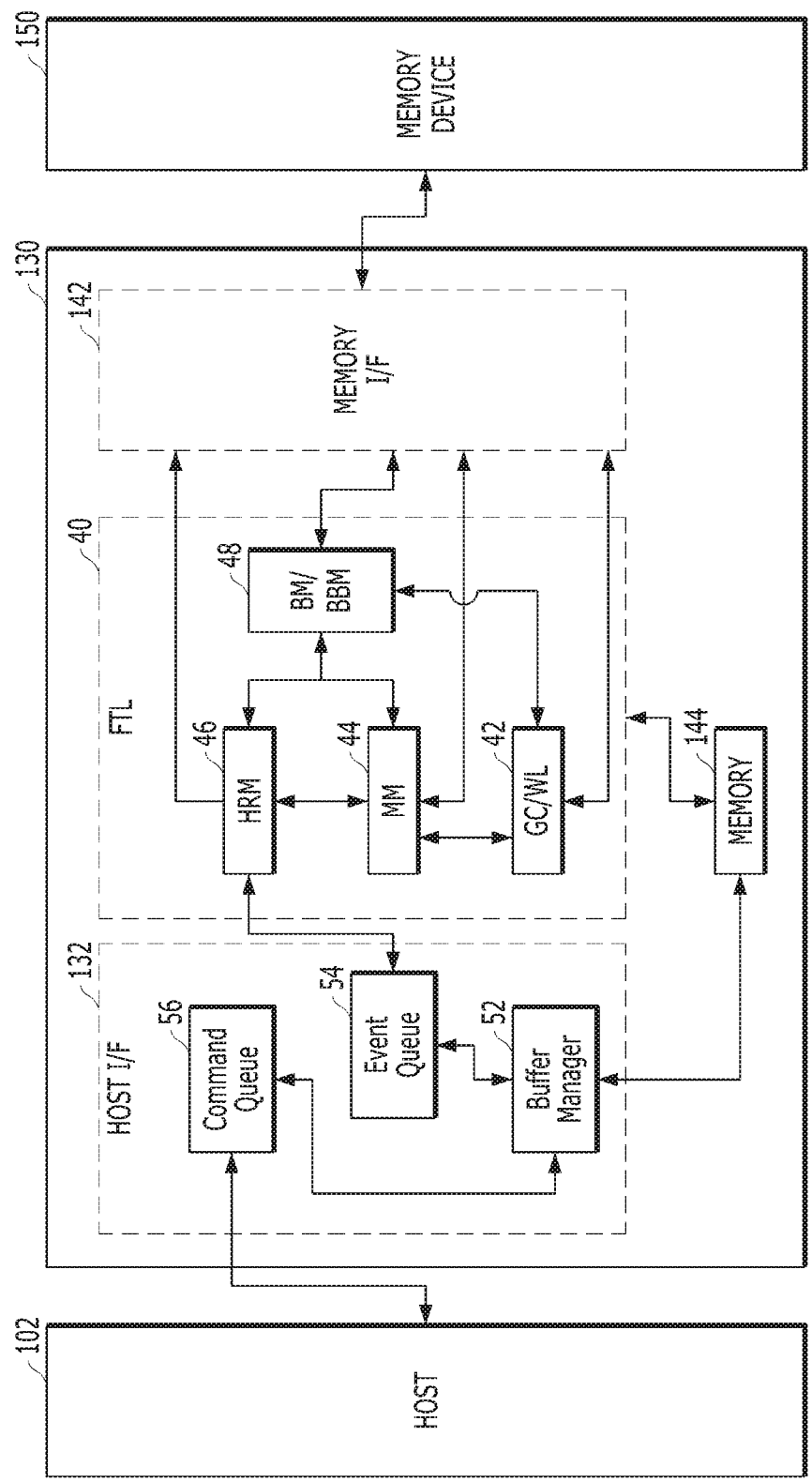
FIG. 3 illustrates an example of a data processing system including a memory system in accordance with an embodiment.

Referring to FIG. 3, a controller in a memory system according to another embodiment of this disclosure is described in detail. The memory system shown in FIG. 3 may correspond to at least one of the plurality of memory systems 110 shown in FIG. 2. The controller 130 cooperates with the host 102 and the memory device 150. As illustrated, the controller 130 includes a host interface 132, a flash translation layer (FTL) 40, as well as the host interface 132, the memory interface 142 and the memory 144 previously identified in connection with FIG. 2.

Although not shown in FIG. 3, according to an embodiment, the ECC component 138 described in FIG. 2 may be included in the flash translation layer (FTL) 40. In another embodiment, the ECC component 138 may be implemented as a separate module, a circuit, firmware or the like, which is included in, or corresponding to, the controller 130.

The host interface 132 is for handling commands, data, and the like transmitted from the host 102. By way of example but not limitation, the host interface 132 may include a command queue 56, a buffer manager 52 and an event queue 54. The command queue 56 may sequentially store commands, data, and the like received from the host 102 and output them to the buffer manager 52 in an order in which they are stored. The buffer manager 52 may classify, manage or adjust the commands, the data, and the like, which are received from the command queue 56. The event queue 54 may sequentially transmit events for processing the commands, the data, and the like received from the buffer manager 52.

A plurality of commands or data of the same characteristic, e.g., read or write commands, may be transmitted from the host 102, or commands and data of different characteristics may be transmitted to the memory system 110 after being mixed or jumbled by the host 102. For example, a plurality of commands for reading data (read commands) may be delivered, or read commands and commands for programming/writing data (write commands) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the characteristics of commands, data, and the like, which have been received from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 40. The event queue 54 receives events, entered from the buffer manager 52, which are to be internally executed and processed by the memory system 110 or the controller 130 in response to the commands, the data, and the like transmitted from the host 102, to deliver the events into the flash translation layer (FTL) 40 in the order received.

According to an embodiment, the host interface 132 described in FIG. 3 may perform some functions of the controller 130 described in FIG. 2. The host interface 132 may set the first memory 104 in the host 102 as a slave and add the first memory 104 as an additional storage space which is controllable or usable by the controller 130.

According to an embodiment, the flash translation layer (FTL) 40 can include a host request manager (HRM) 46, a map manager (MM) 44, a state manager (GC/WL) 42 and a block manager (BM/BBM) 48. The host request manager (HRM) 46 can manage the events entered from the event queue 54. The map manager (MM) 44 can handle or control map data. The state manager (GC/WL) 42 can perform garbage collection (GC) or wear leveling (WL). The block manager 48 can execute commands or instructions on a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (currently having no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 may check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address corresponding to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the state manager 42 requests the map update in a state in which copying of valid page(s) is not completed normally, the map manager 44 may not perform the mapping table update. It is because the map request is issued with old physical information when the state manger 42 requests a map update and a valid page copy is completed later. The map manager 44 may perform a map update operation to ensure accuracy only when the latest map table still points to the old physical address.

According to an embodiment, at least one of the state manager 42, the map manager 44 or the block manager 48 can include circuitry for performing its own operation. As used in this disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and(c) to circuits, such as a microprocessor(s) or a portion of a microprocessor(s), that require software or firmware for operation, even when the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and when applicable to a particular claim element, an integrated circuit for a storage device.

The memory device 150 can include a plurality of memory blocks. The plurality of memory blocks can be any of different types of memory blocks such as a single level cell (SLC) memory block, a multi level cell (MLC) Cell) memory block or the like, according to the number of bits that can be stored or indicated in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have greater storage capacity for the same space compared to the SLC memory block. The MLC memory block can be highly integrated in a view of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

Figure 4:
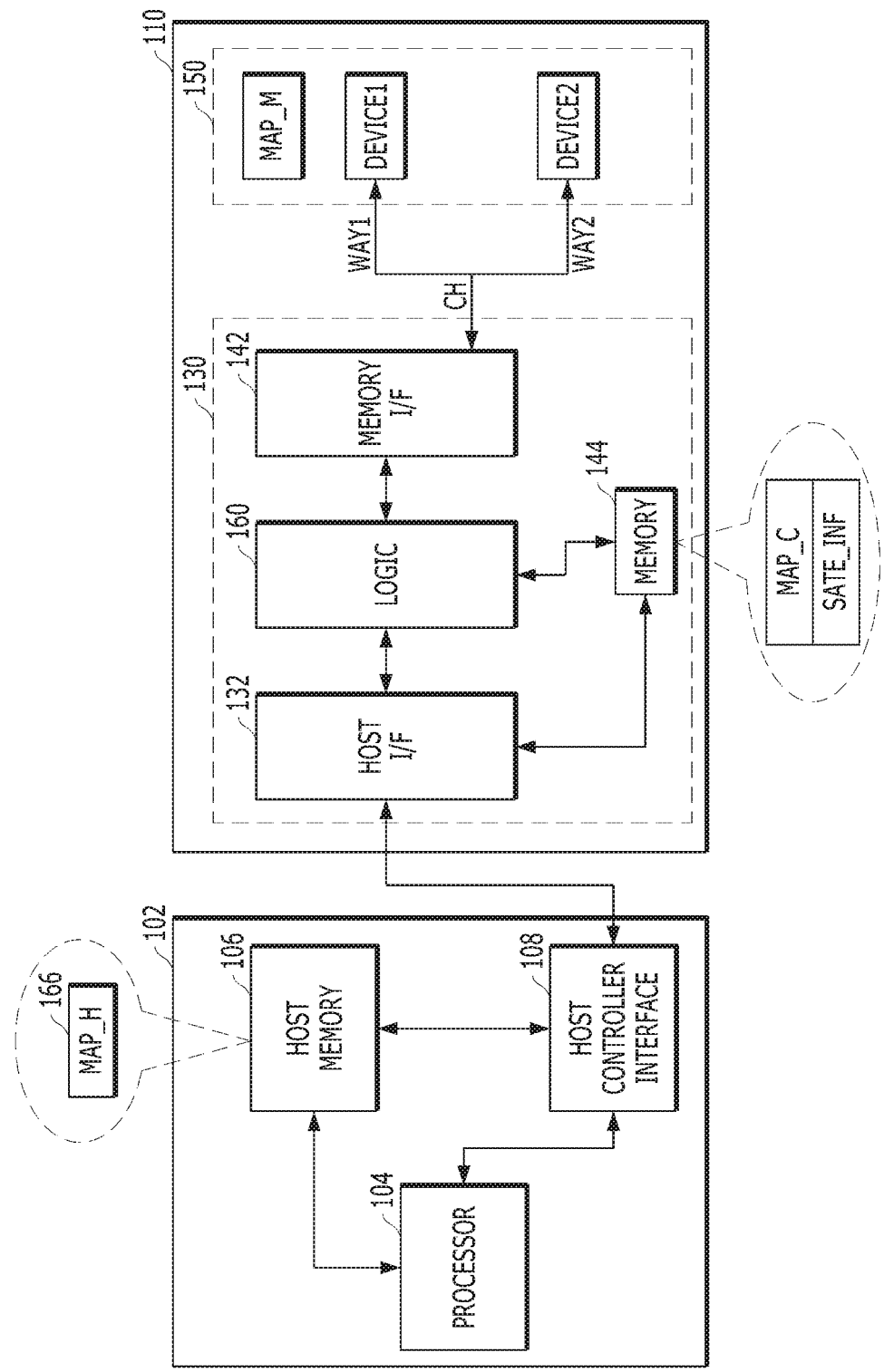
FIG. 4 illustrates an example of a data processing system including a memory system in accordance with an embodiment.

Referring to FIG. 4, the host 102 may include a processor 104, host memory 106, and a host controller interface 108. The memory system 110 may include a controller 130 and a memory device 150. Herein, the controller 130 and the memory device 150 described with reference to FIG. 4 may correspond to the controller 130 and the memory device 150 described with reference to FIGS. 1 to 2.

FIG. 4 illustrates certain differences with respect to the data processing system shown in FIGS. 1 and 2. Particularly, a logic block 160 in the controller 130 may correspond to the flash translation layer (FTL) 40 described with reference to FIG. 2. However, according to an embodiment, the logic block 160 in the controller 130 may perform an additional function that the flash translation layer (FTL) 40 of FIG. 2 may not perform.

The host 102 may include the processor 104, which has a higher performance than that of the memory system 110. the host 102 also includes the host memory 106 which is capable of storing a greater amount of data than that of the memory system 110 that cooperates with the host 102. The processor 104 and the host memory 106 in the host 102 have an advantage in terms of space and upgradability. For example, the processor 104 and the host memory 106 have less of a space limitation than the processor 134 and the memory 144 in the memory system 110. The processor 104 and the host memory 106 may be replaceable with upgraded versions, which is different than the processor 134 and the memory 144 in the memory system 110. In the embodiment of FIG. 4, the memory system 110 can utilize the resources of the host 102 in order to increase the operation efficiency of the memory system 110.

As an amount of data stored in the memory system 110 increases, an amount of metadata corresponding to the data stored in the memory system 110 also increases. When storage capability used to load the metadata in the memory 144 of the controller 130 is limited or restricted, the increased amount of loaded metadata may cause an operational burden on the controller 130. For example, because of the limitation of space or region allocated for metadata in the memory 144 of the controller 130, only some, but not all, of the metadata may be loaded. If the loaded metadata does not include specific metadata for a physical location to which the host 102 intends to access, the controller 130 must store the loaded metadata back into the memory device 150 if some of the loaded metadata has been updated, as well as load the specific metadata for the physical location the host 102 intends to access. These operations should be performed for the controller 130 to perform a read operation or a write operation directed by the host 102, and may degrade performance of the memory system 110.

Storage capability of the host memory 106 in the host 102 may be tens or hundreds of times greater than that of the memory 144 in the controller 130. The memory system 110 may transfer metadata 166 used by the controller 130 to the host memory 106 so that at least some part or portion of the host memory 106 may be accessed by the memory system 110. The part of the host memory 106 accessible by the memory system 110 can be used as a cache memory for address translation required for reading or writing data in the memory system 110. In this case, the host 102 translates a logical address into a physical address based on the metadata 166 stored in the host memory 106 before transmitting the logical address along with a request, a command, or an instruction to the memory system 110. Then, the host 102 can transmit the translated physical address with the request, the command, or the instruction to the memory system 110. The memory system 110, which receives the translated physical address with the request, the command, or the instruction, may skip an internal process of translating the logical address into the physical address and access the memory device 150 based on the physical address transferred. In this case, overhead (e.g., operational burden) of the controller 130 loading metadata from the memory device 150 for the address translation may be reduced or eliminated, and operational efficiency of the memory system 110 can be enhanced.

On the other hand, even if the memory system 110 transmits the metadata 166 to the host 102, the memory system 110 can control mapping information based on the metadata 166 such as metadata generation, erase, update, and the like. The controller 130 in the memory system 110 may perform a background operation such as garbage collection or wear leveling according to an operation state of the memory device 150 and may determine a physical address, i.e., which physical location in the memory device 150 data transferred from the host 102 is to be stored. Because a physical address of data stored in the memory device 150 may be changed and the host 102 has not recognized the changed physical address, the memory system 110 may control the metadata 166 on its own initiative.

While the memory system 110 controls metadata used for the address translation, it can be determined that the memory system 110 needs to modify or update the metadata 166 previously transmitted to the host 102. The memory system 110 can send a signal or metadata to the host 102 so as to request the update of the metadata 166 stored in the host 102. The host 102 may update the stored metadata 166 in the host memory 106 in response to a request delivered from the memory system 110. This allows the metadata 166 stored in the host memory 106 in the host 102 to be kept as the latest version such that, even though the host controller interface 108 uses the metadata 166 stored in the host memory 106, there is no problem in an operation that a logical address is translated into a physical address and the translated physical address is transmitted along with the logical address to the memory system 110.

The metadata 166 stored in the host memory 106 may include mapping information used for translating a logical address into a physical address.

Referring to FIG. 4, metadata associating a logical address with a physical address may include two distinguishable items: a first mapping information item used for translating a logical address into a physical address; and a second mapping information item used for translating a physical address into a logical address. Among them, the metadata 166 stored in the host memory 106 may include the first mapping information. The second mapping information can be primarily used for internal operations of the memory system 110, but might not be used for operations requested by the host 102 to store data in the memory system 110 or read data corresponding to a particular logical address from the memory system 110. In an embodiment, the second mapping information item might not be transmitted by the memory system 110 to the host 102.

The controller 130 in the memory system 110 can control (e.g., create, delete, update, etc.) the first mapping information item or the second mapping information item, and store either the first mapping information item or the second mapping information item to the memory device 150. Because the host memory 106 is a type of volatile memory, the metadata 166 stored in the host memory 106 may disappear when an event such as interruption of power supply to the host 102 and the memory system 110 occurs. Accordingly, the controller 130 in the memory system 110 might not only keep the latest state of the metadata 166 stored in the host memory 106, but also store the latest state of the first mapping information item or the second mapping information item in the memory device 150.

Figure 5:
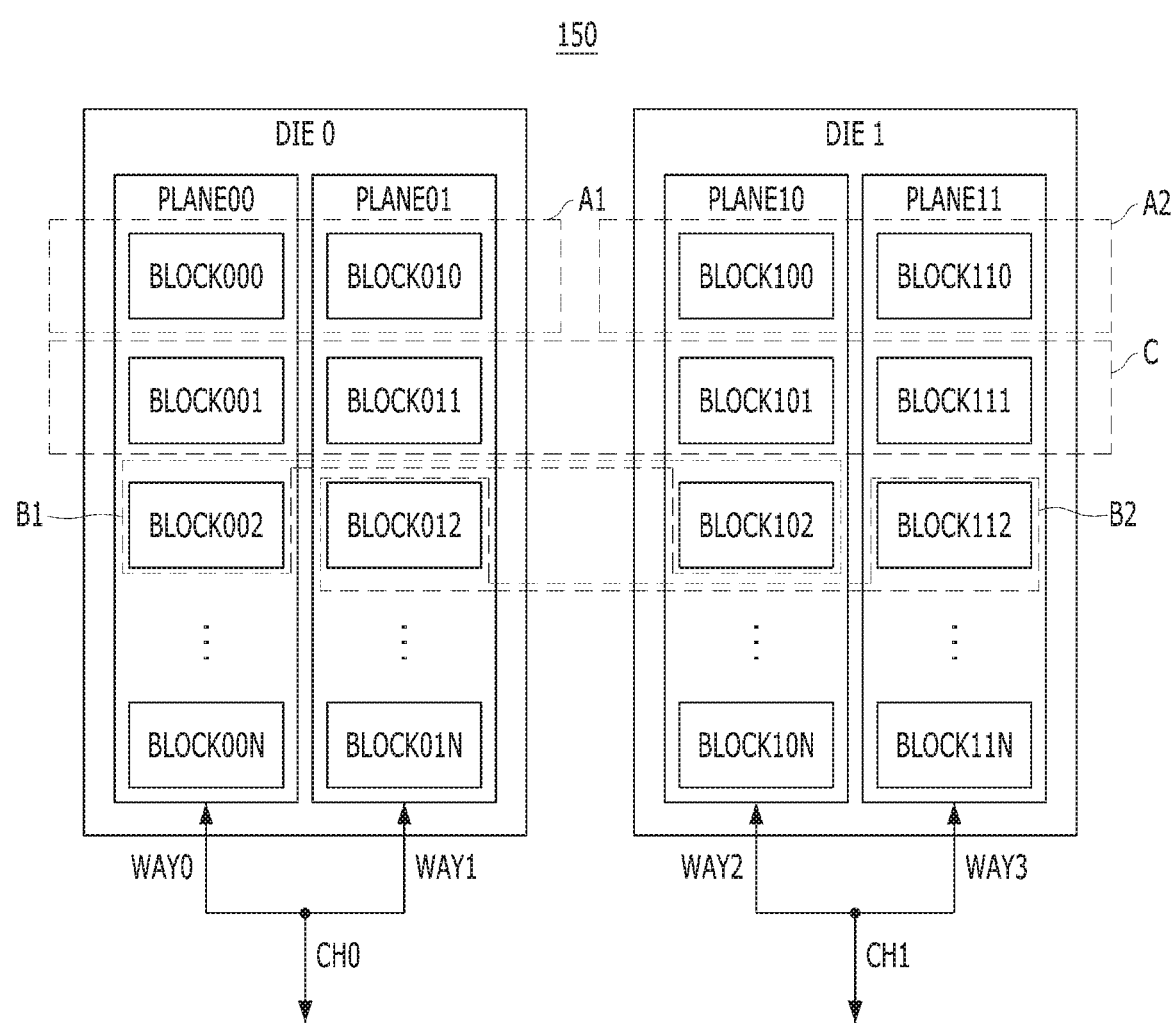
FIG. 5 illustrates examples of a memory device in accordance with an embodiment.

FIG. 5 is a diagram illustrating a super memory block used in a memory system in accordance with an embodiment of the present invention.

Referring to FIG. 5, the memory device 150 includes a plurality of memory blocks BLOCK000 to BLOCK11N.

The memory device 150 includes a zeroth memory die DIE0 capable of inputting/outputting data through a zeroth channel CH0 and a first memory die DIE1 capable of inputting/outputting data through a first channel CH1, CH0 and CH1 may input/output data in an interleaving scheme.

DIE0 includes a plurality of planes PLANE00 and PLANE01 respectively corresponding to a plurality of ways WAY0 and WAY1 capable of inputting/outputting data in the interleaving scheme by sharing CH0.

DIE1 includes a plurality of planes PLANE10 and PLANE11 respectively corresponding to a plurality of ways WAY2 and WAYS capable of inputting/outputting data in the interleaving scheme by sharing CH1.

PLANE00 of DIE0 includes a set number of memory blocks BLOCK000 to BLOCK00N among the plurality of memory blocks BLOCK000 to BLOCK11N.

PLANE01 of DIE0 includes a set number of memory blocks BLOCK010 to BLOCK01N among the plurality of memory blocks BLOCK000 to BLOCK11N.

PLANE10 of DIE1 includes a set number of memory blocks BLOCK100 to BLOCK10N among the plurality of memory blocks BLOCK000 to BLOCK11N.

PLANE11 of DIE1 includes a set number of memory blocks BLOCK110 to BLOCK11N among the plurality of memory blocks BLOCK000 to BLOCK11N.

In this manner, the plurality of memory blocks BLOCK000 to BLOCK11N in the memory device 150 may be divided into groups according to their physical positions and their use of the ways and channels. The set number of memory blocks in each plane may be the same.

FIG. 5 illustrates, as an example, that the memory device 150 has two dies, each of which has two planes, each of which has the same set number of memory blocks. It is noted, that according to system and/or design specifications, any suitable number of memory dies may be included in the memory device 150, and any suitable number of planes may be included in each memory die. Also, any suitable number of memory blocks may be included in each plane according to system and/or design specifications.

The controller 130 may manage a plurality of memory blocks by grouping the memory blocks into several super memory blocks. Each super memory block includes a subset of memory blocks which may be selected simultaneously among all memory blocks in the memory device 150.

Various schemes of grouping the plurality of memory blocks into a plurality of super memory blocks by the controller 130 are exemplified herein with reference to FIG. 5.

A first scheme is to manage one super memory block A1 by grouping, by the controller 130, one memory block BLOCK000 in the first plane PLANE00 and one memory block BLOCK010 in the second plane PLANE01 of the zeroth memory die DIE0 in the memory device 150. When applying the first scheme to the first memory die DIE1, the controller 130 may manage one super memory block A2 by grouping one memory block BLOCK100 in the first plane PLANE10 and one memory block BLOCK110 in the second plane PLANE11 of the first memory die DIE1.

A second scheme is to manage one super memory block B1 by grouping, by the controller 130, one memory block BLOCK002 in the first plane PLANE00 of the zeroth memory die DIE0 and one memory block BLOCK102 in the first plane PLANE10 of the first memory die DIE1. When applying the second scheme again, the controller 130 may manage one super memory block B2 by grouping one memory block BLOCK012 in the second plane PLANE01 of the zeroth memory die DIE0 and one memory block BLOCK112 in the second plane PLANE11 of the first memory die DIE1.

A third scheme is to manage one super memory block C by grouping, by the controller 130, one memory block BLOCK001 in the first plane PLANE00 of the zeroth memory die DIE0, one memory block BLOCK011 in the second plane PLANE01 of the zeroth memory die DIE0, one memory block BLOCK101 in the first plane PLANE10 of the first memory die DIE1 and one memory block BLOCK111 in the second plane PLANE11 of the first memory die DIE1.

In the respective super memory blocks, memory blocks may be simultaneously selected through an interleaving scheme, for example, a channel interleaving scheme, a memory die interleaving scheme, a memory chip interleaving scheme or a way interleaving scheme.

Hereinafter, an example of the command operation performed by the memory system according to an embodiment of the present disclosure is described with reference to FIGS. 4 and 6. In particular, although FIG. 6 illustrates a read request as an access request inputted from a host, the present disclosure is not limited thereto.

Hereinafter, an example of the command operation performed by the memory system according to an embodiment of the present disclosure is described with reference to FIGS. 4 and 6.

Figure 6:
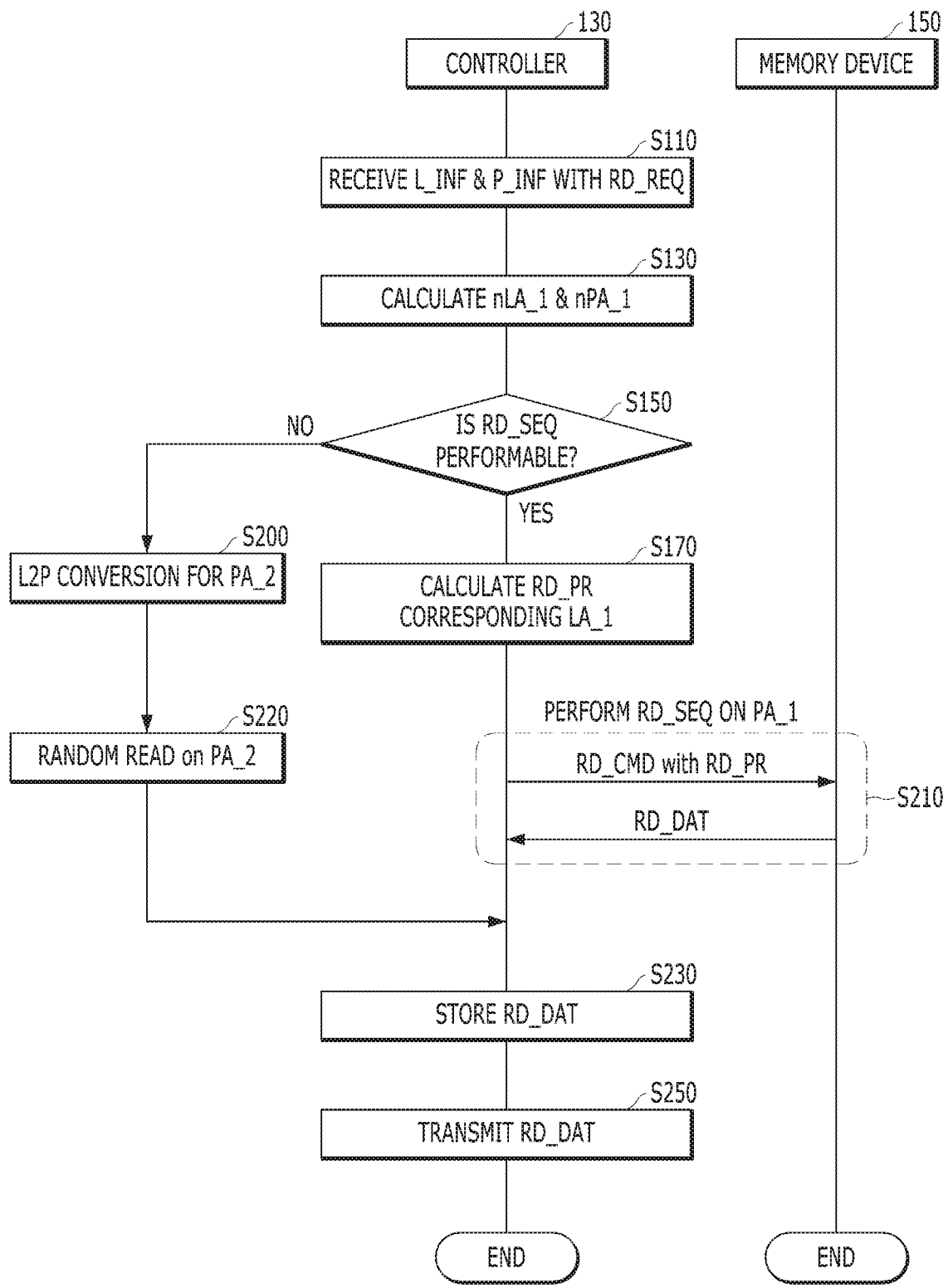
FIG. 6 illustrates an example of a method for performing a read operation by a memory system in accordance with an embodiment.

In particular, although FIG. 6 illustrates a read request as an access request inputted from a host, the present disclosure is not limited thereto.

Referring to FIG. 6, the controller 130 receives logical information LA_INF and physical information PA_INF corresponding to the logical information LA_INF together with a read request RD_REQ from the host (e.g. host 102 of FIG. 4) in step S110.

The logical information LA_INF is for a first logical address LA_1 related to the read request RD_REQ, and the physical information PA_INF is for a first physical address PA_1 related to the first logical addresses LA_1.

The logical information LA_INF includes a reference logical address LA_REF and a logical address range LA_R. The physical information PA_INF includes a reference physical address PA_REF and a consecutive physical address number nCPA.

The reference physical address PA_REF may include a physical address corresponding to the reference logical address LA_REF. The consecutive physical address number nCPA may include the number of physical addresses consecutive with the reference physical address PA_REF.

In step S130, the controller 130 calculates a first logical address number nLA_1 and a first physical address number nPA_1 for determining whether a sequential read operation RD_SEQ is performable.

The first logical address number nLA_1 is the number of a plurality logical addresses included in the first logical address LA_1. The first logical address number nLA_1 may be calculated based on the reference logical address LA_REF and the logical address range LA_R. The first physical address number nPA_1 is the number of the reference physical address PA_REF and a plurality physical addresses that consecutive with the reference physical address PA_REF. The first physical address number nPA_1 may be calculated based on the reference physical address PA_REF and the consecutive physical address number nCPA.

In step S150. the controller 130 may determine that the sequential read operation RD_SEQ is performable, based on the first logical address number nLA_1 and the first physical address number nPA_1. In the present embodiment, the controller 130 may compare the first logical address number nLA_1 with the first physical address number nPA_1.

When the first logical address number nLA_1 is less than or equal to the first physical address number nPA_1, the controller 130 may determine that all the physical addresses corresponding to the first logical address LA_1 are all consecutive. Accordingly, the controller 130 may determine that the sequential read operation RD_SEQ is performable in response to the read request RD_REQ.

When the first logical address number nLA_1 is greater than the first physical address number nPA_1, the controller 130 may determine that the physical addresses corresponding to the first logical address LA_1 are not all consecutive. Accordingly, the controller 130 may determine that the sequential read operation RD_SEQ is not performable.

When a determination result obtained in step S150 indicates that the sequential read operation RD_SEQ is performable, the controller 130 may calculate a read physical range RD_PR including physical addresses corresponding to the first logical address LA_1, in step S170.

In this case, the controller 130 may calculate the read physical range RD_PR without an L2P conversion operation for searching for the physical addresses.

Meanwhile, if the read physical range RD_PR is calculated based on only the physical information PA_INF, the read physical range RD_PR may include some physical addresses which are not related to the first logical address LA_1. Accordingly, the controller 130 calculates the read physical range RD_PR based on the logical information LA_INF and the physical information PA_INF. For example, when the reference physical address PA_REF is 'PA5', the consecutive physical address number nCPA is '9' and the first logical address number nLA_1 is '3', the controller 130 may calculate the physical addresses 'PA5, PA6 and PA7' (not 'PA5 to PA14') as the read physical range RD_PR, which is described in detail with reference to FIGS. 7A and 7B.

The controller 130 may perform the sequential read operation RD_SEQ on the calculated read physical range RD_PR, in step S210. In this case, the controller 130 may transmit the read physical range RD_PR to the memory device 150 and receive read data RD_DAT, stored in a physical region (i.e., pages) of the memory device 150 corresponding to the first physical address PA_1, in an interleaving manner. Since a location where the read operation is performable in the interleaving manner has been described with reference to FIGS. 5, description thereof is omitted here. Thereafter, the controller 130 stores the received read data RD_DAT in the memory (reference numeral '144' of FIG. 4), in step S230. The controller 130 transmits the read data RD_DAT, stored in the memory 144, to the host 102, in step S250.

When a determination result obtained in step S150 indicates that the sequential read operation RD_SEQ is not performable, the controller 130 determines that the physical addresses corresponding to the logical addresses included in the first logical address LA_1 are not consecutive, but random. Accordingly, the controller 130 performs the L2P conversion operation to search for a second physical address PA_2, corresponding to the logical addresses included in the first logical address LA_1, in the L2P map data, in step S200.

The controller 130 performs a random read operation on the searched second physical address PA_2, in step S220. In this case, the controller 130 may transmit a plurality of physical addresses, included in the second physical address PA_2, to the memory device 150 several times. The controller 130 may randomly receive the read data RD_DAT.

In step S170, the controller 130 may further perform a determination of a validity of the first physical address PA_1, based on dirty information or invalid address information which corresponds to the first logical address LA_1. In the present embodiment, the dirty information may include information on whether a storage location of data corresponding to a logical address is changed. In other words, the dirty information may indicate whether the physical address corresponding to the first logical address LA_1 is changed. The invalid address information may include information on an invalidated physical address through the change in storage location of the data corresponding to the logical address, an erase operation or a mapping release operation of the physical address corresponding to the logical address.

When the first physical address PA_1 is not valid, the controller 130 determines whether a map miss occurs in the L2P map data for the first logical address LA_1. In other words, the controller 130 determines whether the L2P map data for the first logical address LA_1 is included in the controller map data MAP_C stored in the memory 144. When the map data for the first logical address LA_1 is included in the controller map data MAP_C, the controller 130 determines that a map hit of the controller map data MAP_C, not the map miss, has occurred for the first logical address LA_1. Accordingly, the controller 130 searches for and obtains the second physical address PA_2, which corresponds to the first logical address LA_1 and is valid, in the controller map data MAP_C, in step S200. When the map data for the first logical address LA_1 is not included in the controller map data MAP_C, the controller 130 determines that the map miss of the controller map data MAP_C has occurred for the first logical address LA_1. Thus, the controller 130 may perform the map downloading operation of the memory map data MAP_M. The controller 130 stores the memory map data MAP_M downloaded from the memory device 150 as the controller map data MAP_C in the memory 144. As a result, the controller map data MAP_C may be updated through the map downloading operation. The controller 130 may search for and obtain the second physical address PA_2 for the first logical address LA_1 in the updated controller map data MAP_C_2.

Figure 7A:
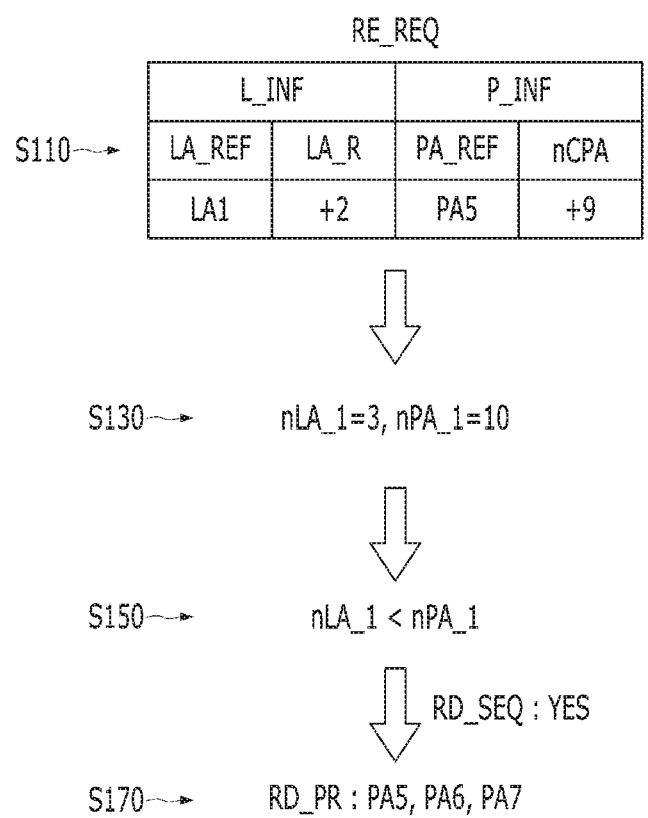

FIGS. 7A and 7B illustrate an example of a method for performing the read operation by a data processing system, including the memory system illustrated in FIG. 6, in accordance with an embodiment.

Hereinafter, a specific method of the sequential read operation RD_REQ described above in FIG. 6 is described in detail with reference to FIGS. 7A and 7B. As an example, it is described in FIGS. 7A and 7B that the reference logical address LA_REF and the reference physical address PA_REF includes the lowest address index among consecutive logical addresses, the logical address range LA_R includes the number of consecutive logical addresses with the reference logical address LA_REF. However, the present disclosure is not limited thereto.

Referring to FIG. 7A, the reference logical address LA_REF may include 'LA1' and the logical address range LA_R may include '+2'. The reference physical address PA_REF and the consecutive physical address number nCPA, included in the physical information PA_INF, include 'PA5' and '+9', respectively. Accordingly, the controller 130 may calculate the first logical address number nLA_1 is '3' by summing of the number (1EA) of the reference logical address LA_REF and the number (2EA) of the logical address range LA_R. The controller 130 may determine that the first logical address LA_1 include the reference logical address 'LA1' and the consecutive logical addresses 'LA2' and 'LA3' with the reference logical address 'LA1'.

In addition, the controller 130 may calculate the first physical address number nPA_1 of '10' by summing of the number (1EA) of the reference physical address PA_REF and the consecutive physical address number nCPA (9EA). In other words, the controller 130 may determine that the nine physical addresses 'PA6, PA7, PA8, PA9, PA10, PAU, PA12, PA13 and PA14' are consecutive with the reference physical address 'PA5', in step S130.

Since '3EA' (which is the first logical address number nLA_1) is less than '10EA' (which is the first logical address number nPA_1), the controller 130 may determine that the sequential read operation RD_SEQ is performable, in step S150. In other words, the controller 130 determines that physical addresses corresponding to three consecutive logical addresses included in the first logical address LA_1 are all consecutive. The controller 130 may determine the three consecutive physical addresses 'PA5', 'PA6' and 'PA7' as the read physical range RD_PR corresponding to the first logical address LA_1.

Accordingly, the controller 130 may perform the sequential read operation RD_SEQ on the 'PA5', 'PA6' and 'PA7', which are included in the read physical range RD_PR. As described above, in the embodiment illustrated in FIGS. 6, 7A and 7B, the controller 130 may perform the sequential read operation RD_SEQ on consecutive physical addresses, inputted from the host 102, without performing the L2P conversion operation.

To this end, as illustrated in FIG. 7B, the memory system 110 generates and adds the consecutive physical address number nCPA for each piece of L2P map information, and uploads the consecutive physical address number nCPA to the host 102. The host 102 may transmit the L2P map information, including the consecutive physical address number nCPA inputted from the memory system 110, to the memory system 110 together with the read request RD_REQ.

Figure 8A:
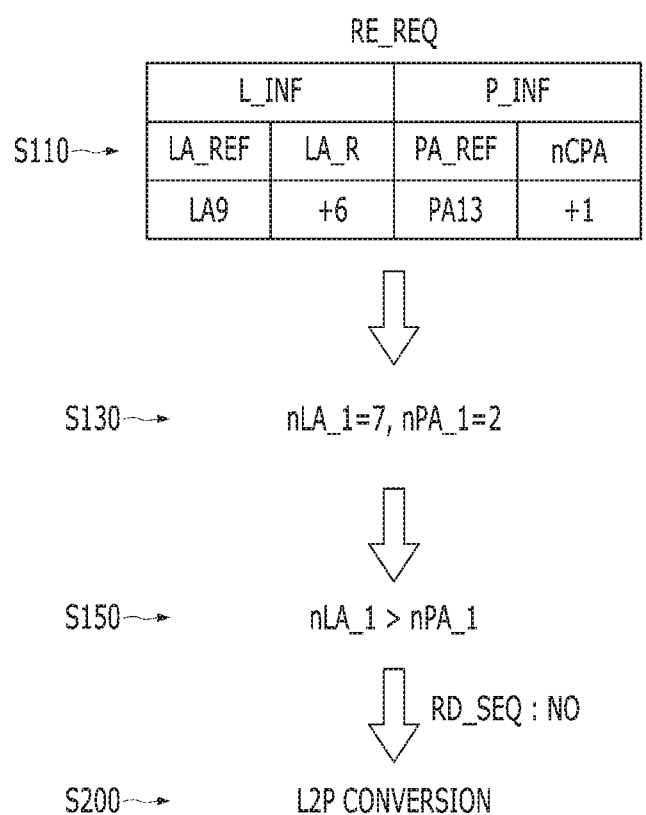

FIGS. 8A and 8B illustrate another example of a method for performing the read operation by a data processing system, including the memory system illustrated in FIG. 6, in accordance with an embodiment.

Hereinafter, a case in which the sequential read operation RD_SEQ described in FIG. 6 is not performable is described with reference to FIGS. 8A and 8B.

Referring to FIG. 8A, the reference logical address LA_REF may include 'LA9' and the logical address range LA_R may include '+6'. The reference physical address PA_REF and the consecutive physical address number nCPA, included in the physical information PA_INF, include 'PA_13' and '+1', respectively. The controller 130 may calculate the first logical address number nLA_1 is '7EA' by summing of the number (1EA) of the reference logical address LA_REF and the number (6EA) of logical addresses included in the logical address range LA_R. The controller 130 may determine that the first logical address LA_1 include the reference logical address 'LA9' and the logical addresses 'LA10 to LA15' consecutive with the reference logical address 'LA9'.

In addition, the controller 130 may calculate the first physical address number nPA_1 of '2EA' by summing of the number (1EA) of the reference physical address PA_REF and consecutive physical address number nCPA (1EA). In other words, the controller 130 may determine that the one physical addresses 'PA14' is consecutive with the reference physical address 'PA13', in step S130.

Since '7' (which is the first logical address number nLA_1) is greater than '2' (which is the first logical address number nPA_1), the controller 130 may determine that the sequential read operation RD_SEQ is not performable, in step S150. In other words, the controller 130 determines that physical addresses corresponding to three consecutive logical addresses included in the first logical address LA_1 are not all consecutive.

Accordingly, the controller 130 performs a L2P operation to search for a second physical address PA_2 corresponding to 'LA9 to LA15' included in the first logical address LA_1, with reference to the L2P map data illustrated in FIG. 8B, in step S200. The controller 130 performs the random read operation on the searched 'PA13, PA14, PA101, PA98, PA56, PA23 and PA24', in step S220.

As described above, according to the embodiment illustrated in FIGS. 8A and 8B, the controller 130 may perform the random read operation on the second physical address PA_2 searched through the L2P conversion operation, instead of the consecutive physical address inputted from the host 102.

Figure 9A:
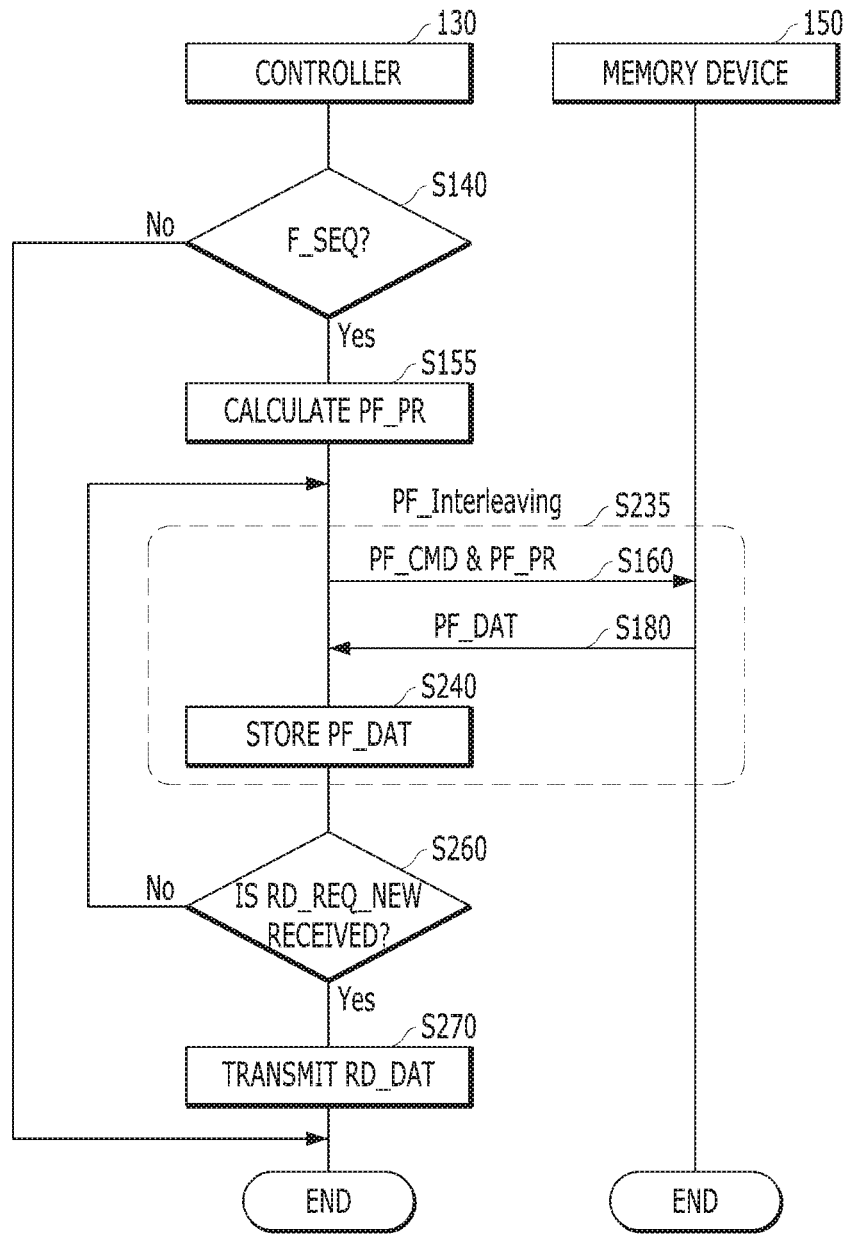

FIGS. 9A to 9C illustrate an example of a method for performing a sequential prefetch operation PF_SEQ by the memory system 110 in accordance with an embodiment. Particularly, FIGS. 9A to 9C illustrate a method for prefetching data, corresponding to a prefetch physical range PF_PR which is consecutive with the read physical range RD_PR, into the memory 144.

Referring to FIGS. 6, 9A and 9B, although the controller 130 does not receive a read request corresponding to the prefetch physical range PF_PR from the host, the controller 130 determines, in step S140, whether the sequential prefetch operation PF_SEQ corresponding to the prefetch physical range PF_PR is performable while the sequential read operation RD_SEQ is performed on the read physical range RD_PR of step S210 of FIG. 6.

The controller 130 may prefetch the data corresponding to the prefetch physical range PF_PR, which are consecutive with the read physical range RD_PR in step S170 of FIG. 6, into the memory 144.

To this end, the controller 130 may determine whether the sequential prefetch operation PF_SEQ is performable, in step S140, and calculate a prefetch physical range PF_PR, in step S155, based on the first physical address number nPA_1 and the read physical range RD_PR.

When the number of the read physical range RD_PR is less than the first physical address number nPA_1, the controller 130 determines that the sequential prefetch operation PF_SEQ is performable on one or more physical addresses consecutive with the read physical range RD_PR.

When the read physical range RD_PR is equal to or greater than the first physical address number nPA_1, the controller 130 may determine that the sequential prefetch operation PF_SEQ is not performable since the physical addresses consecutive with the read physical range RD_PR are not present anymore. A detailed description thereon is described with reference to FIGS. 7B and 9B.

Referring to the read request format illustrated in FIG. 7B, the first physical address number nPA_1 is '+10' and read physical range RD_PR includes PA 5 to PA 7. Accordingly, since '3', which is the number of physical addresses included in the read physical range RD_PR, is less than '10', which is the first physical address number nPA_1. Accordingly, the controller 130 may determine that the sequential prefetch operation PF_SEQ is performable on the physical addresses consecutive with the read physical range RD_PR, among the first physical address number nPA_1.

When the number of physical addresses included in the read physical range RD_PR is equal to or greater than the first physical address number nPA_1, the controller 130 determines that there is no physical address on which the sequential prefetch operation PF_SEQ is to be performed. Thus, the procedure may terminate.

When the determination result obtained in step S140 of FIG. 9A indicates that the sequential prefetch operation PF_SEQ is performable (that is, 'YES' in step S140), the controller 130 calculates the prefetch physical range PF_PR for performing the sequential prefetch operation PF_SEQ in step S160. At this time, the controller 130 calculates one or more logical addresses consecutive with the read physical range RD_PR, as the prefetch physical range PF_PR, based on the first physical address number nPA_1 and the read physical range RD_PR.

Subsequently, the controller 130 transmits a prefetch command PF_CMD and one or more prefetch physical addresses PA_PF of 'PA8 to PA14', included in the prefetch physical range PF_PR, to the memory device 150, in step S160.

The controller 130 may receive prefetch data PF_DAT stored in a region, for example, pages, corresponding to the prefetch physical addresses PA_PF, from the memory device 150 in step S180, and store the prefetch data PF_DAT in the memory 144 in the step S240.

The controller 130 determines whether a subsequent read request RD_REQ_NEW is received from the host, in step S260. When the subsequent read request RD_REQ_NEW is received, the controller 130 may transmit the prefetch data PF_DAT to the host 102 as the read data RD_DAT for the subsequent read request RD_REQ_NEW, in step S270.

Figure 10:
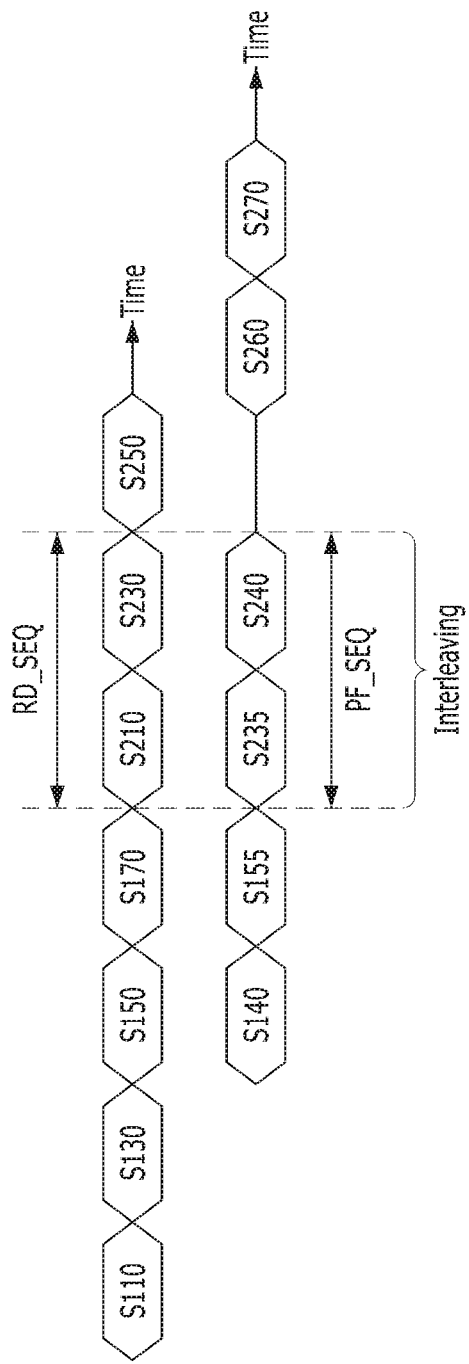
FIG. 10 illustrates an example of a method for performing the read operation and the data prefetch operation by the memory system illustrated in FIG. 6.

FIG. 10 is a timing diagram illustrating an operating method of a data processing system including a memory system in accordance with an embodiment.

As illustrated in FIG. 10, the controller 130 may perform the sequential prefetch operation PF_SEQ in step S235 and S240 simultaneously while the sequential read operation RD_SEQ in step S210 and S230 in the interleaving manner.

The controller 130 may perform the sequential prefetch operation PF_SEQ on the prefetch physical range PF_PR in a period overlapping the sequential read operation RD_SEQ on the read physical range RD_PR. The controller 130 may perform the sequential prefetch operation PF_SEQ until the new subsequent read request RD_REQ_NEW is inputted from the host 102 in step S260.

When the subsequent read request RD_REQ_NEW, for requesting the prefetched data, inputted from the host 102 is a request for the prefetch data PF_DAT, the controller 130 may transmit the prefetch data PF_DAT, stored in the memory 144, to the host 102, in step S270. Therefore, the data processing system including the memory system according to an embodiment may rapidly perform the read operation.

As described above, the operational efficiency of the memory system 110 may be improved based on the different embodiments described with reference to FIGS. 1A to 1E and 6 to 10. The memory system 110 may use a region or part of the host memory 106 in the host 102 as a cache or a buffer, and store meta data or user data, thereby overcoming a limitation in a storage space of the memory 144 used by the controller 130 in the memory system 110.

These and other features and advantages of the present invention are not limited to the embodiments described above, as it will be apparent to those skilled in the art of the present disclosure from the above-detailed description that features of the invention may be embodied in different forms and ways.

The effects of the memory system, the data processing system and the driving method thereof according to embodiments of the present disclosure are as follows.

According to embodiments, the data processing system including the memory system and a computing device or an external device including a host may efficiently control an operation of transmitting map data by the memory system, thereby reducing overhead that may occur in data transmission between the memory system and the computing device or the host in the data processing device.

According to embodiments, in the memory system, the data processing system and the driving method thereof, a memory device may perform a command operation corresponding to a physical address inputted, together with a command, from an external device, thereby reducing overhead of the memory system, which occurs due to unnecessary L2P conversion, and improving performance speed and efficiency of the command operation of the memory system.

According to embodiments, the data processing system including the memory system and an external device may perform a command operation on a reference physical address inputted from the external device and one or more physical addresses consecutive with the reference physical address, thereby reducing command performance time of the memory system, and improving performance speed and efficiency of the command operation of the memory system.

According to embodiments, a sequential access operation may be performed when access to data stored in a physically consecutive space is requested, thereby accessing the data more efficiently.

According to embodiments, read data according to a subsequently expected read request may be prefetched when a sequential read operation is performed, thereby improving performance of the read operation of the memory system and preventing read disturbance.

According to embodiments, data requested to be accessed by a host may be accessed in an interleaving manner, thereby improving performance of an access operation of the memory system.

While the present invention has been illustrated and described with respect to specific embodiments, it will be apparent to those skilled in the art that various changes and modifications may be made without departing from the spirit and scope of the present disclosure as defined in the following claims. The present invention encompasses all such changes and modifications that fall within the scope of the claims including equivalents thereto.

What is claimed is:

1. A memory system comprising:
  a memory device suitable for storing data; and
  a controller in communication with the memory device through a memory interface, suitable for generating L2P map data which includes mapping relationships between a plurality of logical addresses of a host and a plurality of physical addresses of the memory device and a total number of consecutive physical addresses with each of the plurality of physical addresses, and suitable for transmitting the L2P map data therefrom to the host,
  wherein, when a read request is received with logical information and physical information from the host, the controller performs an access operation on a physical address range calculated based on the logical information and the physical information, wherein the physical information includes a reference physical address that is corresponded to a reference logical address included in the logical information, and a consecutive physical address number that is the total number of consecutive physical addresses associated with the reference physical address, wherein the logical information includes a logical address range for indicating consecutive logical addresses with the reference logical address, wherein the controller determines that a sequential read operation is performable when a number of the consecutive logical addresses is less than or equal to the consecutive physical address number, and wherein the controller determines that a sequential prefetch operation is performable when the number of the first consecutive physical addresses is less than the consecutive physical address number.

2. The memory system of claim 1, wherein the reference logical address includes a highest address index or a lowest address index, among logical addresses based on the logical information requested to be accessed by the host.

3. The memory system of claim 1, wherein the logical address range includes the number of the consecutive logical addresses with the reference logical address.

4. The memory system of claim 1,
wherein when the reference logical address includes the lowest address index, the logical address range includes the highest address index, among the logical addresses based on the logical information, or wherein when the reference logical address includes the highest address index, the logical address range includes the lowest address index, among the logical addresses based on the logical information.

5. The memory system of claim 1,
wherein the controller generates the consecutive physical address number based on consecutive logical addresses and consecutive physical addresses included in the map data, and wherein the controller transmits the L2P map data with the generated consecutive physical address number to the host.

6. The memory system of claim 1, wherein the controller calculates the physical address range including a first consecutive physical addresses that the sequential read operation to be performed when the sequential read operation is performable.

7. The memory system of claim 6, wherein the controller calculates a prefetch physical range including a second consecutive physical addresses, except for the first consecutive physical addresses, among consecutive physical addresses based on the physical information when the sequential prefetch operation is performable.

8. The memory system of claim 7, wherein the controller performs the prefetch operation while the sequential read operation is performed in an interleaving manner.

9. The memory system of claim 1, wherein the controller transmits prefetched data, which is a result of the sequential prefetch operation, to the host when a subsequent read request for requesting the prefetched data is received.

10. The memory system of claim 1,
wherein, when the reference physical address is invalid, the controller searches for valid physical addresses corresponding to the logical information in the L2P map data stored in the controller, and wherein the controller performs the access operation on the searched physical addresses.

11. The memory system of claim 1, wherein the controller performs the access operations in an interleaving manner.

12. The memory system of claim 1, wherein the controller performs the access operation on the calculated physical address range without an L2P conversion operation when the reference physical address from the host is valid.

* * * * *